United States Patent
Colombo et al.

(10) Patent No.: US 11,921,910 B2
(45) Date of Patent: Mar. 5, 2024

(54) HARDWARE SECURE ELEMENT, RELATED PROCESSING SYSTEM, INTEGRATED CIRCUIT, AND DEVICE

(71) Applicants: STMicroelectronics S.r.l., Agrate Brianza (IT); STMicroelectronics Application GMBH, Aschheim-Dornach (DE)

(72) Inventors: Roberto Colombo, Munich (DE); Nicolas Bernard Grossier, Oreno di Vimercate (IT); Giovanni Disirio, Salerno (IT)

(73) Assignees: STMicroelectronics Application GMBH, Aschheim-Dornach (DE); STMicroelectronics S.r.l., Agrate Brianza (IT)

( * ) Notice: Subject to any disclaimer, the term of this patent is extended or adjusted under 35 U.S.C. 154(b) by 400 days.

(21) Appl. No.: 17/443,497

(22) Filed: Jul. 27, 2021

(65) Prior Publication Data

US 2021/0357538 A1 Nov. 18, 2021

Related U.S. Application Data

(63) Continuation of application No. 15/975,460, filed on May 9, 2018, now Pat. No. 11,093,658.

(30) Foreign Application Priority Data

May 9, 2017 (IT) .................. 102017000050153

(51) Int. Cl.
*G06F 21/83* (2013.01)
*G06F 9/38* (2018.01)
(Continued)

(52) U.S. Cl.
CPC ............ *G06F 21/83* (2013.01); *G06F 9/3816* (2013.01); *G06F 9/445* (2013.01); *G06F 12/02* (2013.01);
(Continued)

(58) Field of Classification Search
CPC .......... G06F 12/02; G06F 21/57; G06F 21/64; G06F 21/74; G06F 21/83;
(Continued)

(56) References Cited

U.S. PATENT DOCUMENTS

| | | | |
|---|---|---|---|
| 5,742,843 A | 4/1998 | Koyanagi et al. | |
| 7,673,155 B2 * | 3/2010 | Hashimoto | G06F 21/126 |
| | | | 380/226 |

(Continued)

FOREIGN PATENT DOCUMENTS

| | | |
|---|---|---|
| EP | 0696016 A2 | 2/1996 |
| EP | 2500820 A1 | 9/2012 |
| WO | 9705551 A1 | 2/1997 |

OTHER PUBLICATIONS

NXP Freescale Semiconductor, "MPC5634M Microcontroller Datasheet," Rev. 9.2, Jan. 2015, 126 pages.
(Continued)

*Primary Examiner* — Harris C Wang
(74) *Attorney, Agent, or Firm* — Slater Matsil, LLP

(57) ABSTRACT

A hardware secure element includes a processing unit and a receiver circuit configured to receive data comprising a command field and a parameter field adapted to contain a plurality of parameters. The hardware secure element also includes at least one hardware parameter check module configured to receive at an input a parameter to be processed selected from the plurality of parameters, and to process the parameter to be processed to verify whether the parameter has given characteristics. The hardware parameter check
(Continued)

module has associated one or more look-up tables configured to receive at an input the command field and a parameter index identifying the parameter to be processed by the hardware parameter check module, and to determine for the command field and the parameter index a configuration data element.

20 Claims, 11 Drawing Sheets

(51) Int. Cl.

| | | |
|---|---|---|
| G06F 9/445 | (2018.01) | |
| G06F 12/02 | (2006.01) | |
| G06F 21/57 | (2013.01) | |
| G06F 21/64 | (2013.01) | |
| G06F 21/74 | (2013.01) | |
| G09C 1/00 | (2006.01) | |
| H04L 9/32 | (2006.01) | |
| H04L 9/40 | (2022.01) | |
| H04W 4/40 | (2018.01) | |
| H04W 12/03 | (2021.01) | |
| H04W 12/106 | (2021.01) | |
| H04W 12/40 | (2021.01) | |

(52) U.S. Cl.
CPC .............. *G06F 21/57* (2013.01); *G06F 21/64* (2013.01); *G06F 21/74* (2013.01); *G09C 1/00* (2013.01); *H04L 9/3234* (2013.01); *H04W 12/106* (2021.01); *G06F 2212/7209* (2013.01); *H04L 63/0853* (2013.01); *H04W 4/40* (2018.02); *H04W 12/03* (2021.01); *H04W 12/40* (2021.01)

(58) Field of Classification Search
CPC ........... G06F 2212/7209; G06F 9/3816; G06F 9/445; G09C 1/00; H04L 63/0853; H04L 9/3234; H04W 12/03; H04W 12/106; H04W 12/40; H04W 4/40
See application file for complete search history.

(56) References Cited

U.S. PATENT DOCUMENTS

| | | | | |
|---|---|---|---|---|
| 8,213,321 | B2 * | 7/2012 | Butts | H04L 43/0847 |
| | | | | 370/242 |
| 8,284,801 | B1 | 10/2012 | Vashi et al. | |
| 8,623,621 | B2 | 1/2014 | Wang et al. | |
| 8,625,621 | B2 * | 1/2014 | Wang | H04L 49/9042 |
| | | | | 710/53 |
| 8,675,871 | B2 * | 3/2014 | Arnold | H04L 9/0894 |
| | | | | 713/155 |
| 8,953,792 | B2 * | 2/2015 | Arnold | H04L 9/088 |
| | | | | 380/44 |
| 2004/0062267 | A1 * | 4/2004 | Minami | H04L 47/6235 |
| | | | | 370/463 |
| 2005/0265155 | A1 * | 12/2005 | Iwano | G11B 7/126 |
| | | | | 369/44.14 |
| 2007/0011419 | A1 * | 1/2007 | Conti | G06F 12/1458 |
| | | | | 711/163 |
| 2007/0101424 | A1 * | 5/2007 | Ravi | G06F 13/4031 |
| | | | | 713/188 |
| 2007/0226551 | A1 * | 9/2007 | Janke | G06F 21/79 |
| | | | | 714/E11.04 |
| 2008/0147932 | A1 | 6/2008 | Fukazawa et al. | |
| 2009/0158012 | A1 * | 6/2009 | Hansen | G06F 9/30043 |
| | | | | 712/222 |
| 2012/0307999 | A1 * | 12/2012 | Arnold | H04L 9/0894 |
| | | | | 380/44 |
| 2013/0007300 | A1 * | 1/2013 | Candelaria | G06F 13/42 |
| | | | | 710/5 |
| 2013/0061094 | A1 * | 3/2013 | Busch | G06F 11/2215 |
| | | | | 714/E11.178 |
| 2015/0039952 | A1 * | 2/2015 | Goessel | G11C 29/42 |
| | | | | 714/719 |
| 2015/0046702 | A1 * | 2/2015 | Paaske | G06F 21/602 |
| | | | | 713/160 |
| 2015/0082096 | A1 * | 3/2015 | Jiang | G06F 11/3006 |
| | | | | 714/37 |
| 2015/0268974 | A1 * | 9/2015 | Goebel | G06F 9/44552 |
| | | | | 701/1 |
| 2015/0294123 | A1 * | 10/2015 | Oxford | H04L 63/061 |
| | | | | 713/193 |
| 2016/0078253 | A1 * | 3/2016 | Frank | G06F 12/1408 |
| | | | | 726/26 |
| 2016/0080375 | A1 * | 3/2016 | Heidt | H04L 63/0876 |
| | | | | 713/171 |
| 2016/0080376 | A1 * | 3/2016 | Temple | H04L 9/00 |
| | | | | 713/170 |
| 2016/0154744 | A1 | 6/2016 | Zheng et al. | |
| 2016/0255065 | A1 * | 9/2016 | Oshida | H04L 69/324 |
| | | | | 726/3 |
| 2017/0310684 | A1 * | 10/2017 | Wagner | H04L 9/3242 |
| 2018/0330127 | A1 * | 11/2018 | Colombo | H04W 12/106 |
| 2019/0312593 | A1 * | 10/2019 | Hsiao | G06F 11/1068 |

OTHER PUBLICATIONS

Stmicroelectronics, "32-bit Power Architecture® based MCU with 1088KB Flash Memory and 80KB RAM for Automotive Chassis and Safety Applications," SPC56AP60x, SPC56AP54x, SPC560P60x, SPC560P54x, Jun. 2016, 105 pages.

* cited by examiner

*Prior Art*

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| PV7 | | | | PV6 | | | | PV5 | | | | PV4 | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| PV3 | | | | PV2 | | | | PV1 | | | | PV0 | | | |

PDE

FIG. 15

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| ZV_EN | MC | | | AA | | SZEN | SZRES | SZPI | | | MAX_EN | MAX | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| MAX | | | | | | | | | | | | | | | |

CDE

FIG. 16

HARDWARE SECURE ELEMENT, RELATED PROCESSING SYSTEM, INTEGRATED CIRCUIT, AND DEVICE

CROSS-REFERENCE TO RELATED APPLICATIONS

This application is a continuation of U.S. patent application Ser. No. 15/975,460, entitled "HARDWARE SECURE ELEMENT, RELATED PROCESSING SYSTEM, INTEGRATED CIRCUIT, DEVICE AND METHOD," and filed on May 9, 2018, which claims priority to Italian Application No. 102017000050153, filed on May 9, 2017, which application is hereby incorporated herein by reference.

TECHNICAL FIELD

Embodiments of the present disclosure relate generally to electronic circuits. Particular embodiments relate to secure processing systems, such as micro-controllers comprising a hardware secure module.

BACKGROUND

FIG. 1 shows a typical electronic system, such as the electronic system of a vehicle, comprising a plurality of processing systems $10_x$, such as embedded systems or integrated circuits, e.g., a Field Programmable Gate Array (FPGA), Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems $10_x$ are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Security in automotive applications is becoming a key element, especially after it has been demonstrated that hackers may remotely control given functions of a vehicle. For this reason, communications between the various processing systems $10_x$ of the vehicle (at least those having a possible impact on security) should be encrypted, raising additional problems in terms of message processing, e.g., in terms of latency and robustness, e.g., with regards to processing error handling.

These emerging and steadily increasing requests to have security features within the processing systems $10_x$ has led to the introduction of a secure "brain" within each processing system $10_x$. Usually, this secure element is a dedicated and preferably programmable hardware component (e.g., within an FPGA, DSP or micro-controller) and dedicated to handle and/or supervise security functions.

For example, FIG. 2 shows a block diagram of a typical processing system 10 (where processing system 10 is any one of the processing systems $10_x$) with additional security functions, such as a micro-controller.

Typically, the processing system 10 comprises at least one processing unit 102, such as a microprocessor, usually the Central Processing Unit (CPU), programmed via software instructions.

As mentioned before, the processing system 10 comprises also a secure element, often referred to as Hardware Security Module (HSM). Specifically, the secure element HSM comprises a processing unit 106, such as an additional microprocessor programmed via software or a dedicated hardware module, and has one cryptographic co-processor, containing one or more digital encryption/cipher keys (being unknown to the non-secure element, i.e., the processing unit 102) and which may be used, e.g., to encrypt or decrypt data packets. For example, the software developer of a micro-controller can use given security functions while the encryption key is pre-programmed in the secure element and kept secret. Moreover, the firmware of the micro-processor 102 may be updated without having to include the encryption key(s) in the firmware file.

For example, the secure element HSM may be configured to use the encryption key together with a symmetric (e.g., Advanced Encryption Standard, AES) or asymmetric encryption algorithm, e.g., in order to encrypt or decrypt data, verify the identity of a sender, e.g., by decrypting a signature field or calculating a hashing function, etc.

Usually, the secure element HSM is in an isolated environment, e.g., in order to block access to the firmware (and thus the encryption keys) of the processing unit 106.

Generally, the processing system 10 may also comprise one or more resources 104, such as: one or more memories, such as a volatile memory and/or a non-volatile memory, e.g., a flash memory; and/or one or more communication interfaces, such as Universal Asynchronous Receiver/Transmitter (UART), Serial Peripheral Interface Bus (SPI), Inter-Integrated Circuit I$^2$C), CAN bus, Ethernet; and/or one or more analog-to-digital and/or digital-to-analog converters; and/or one or more dedicated digital components, such as hardware timers and/or counters; and/or one or more analog components, such as comparators, sensors, such as a temperature sensor, etc.; and/or one or more mixed signal components, such as a Pulse-Width Modulation (PWM) driver.

Generally, each of these resources 104 may be: a local resource 104a accessible only by the non-secure processing unit 102; a shared resource 104b accessible by both processing units 102 and 106; or a local resource 104c accessible only by the secure processing unit 106.

Accordingly, a processing system 10 comprises a secure element HSM and one or more non-secure elements, e.g., the processing unit 102, where the secure element HSM is typically isolated from the non-secure elements. Accordingly, a communication channel between the secure processing unit 106 and the non-secure processing unit 102 is required in order to be able to run, upon request, security services provided by the secure element HSM that might be needed by an application executed by the processing unit 102.

Such a processing system 10 with dedicated Hardware Security Module are known, e.g., from various TriCore™ AURIX™ microcontrollers (e.g., TC39x or TC3xx from Infineon) or Power Architecture™ microcontrollers (e.g., MPC56xx, MPC57xx from NXP or SPC56x, SPC57x, SPC58x from the present applicant).

SUMMARY

Some embodiments improve the communication between a non-secure processing unit and a secure processing unit.

One or more embodiments improve the communication between a non-secure processing unit and a secure processing unit by using a hardware secure element having the features specifically set forth in the claims that follow. Embodiments moreover concern a related processing system, integrated circuit and device.

The claims are an integral part of the technical teaching of the disclosure provided herein.

As mentioned before, various embodiments of the present disclosure relate to a hardware secure element.

In various embodiments, the hardware secure element comprises a processing unit, such as a microprocessor programmed via software instructions. The processing unit has associated a receiver circuit for receiving data comprising a command field and a parameter field adapted to contain a plurality of parameters.

In various embodiments, the hardware secure element comprises at least one hardware parameter check module configured to receive at an input a parameter to be processed selected from the plurality of parameters, and process this parameter in order to verify whether the parameter has given characteristics.

In various embodiments, the hardware parameter check module has associated one or more look-up tables configured to receive at input the command field and a parameter index identifying the parameter to be processed by the hardware parameter check module, and determine for the command field and the parameter index a configuration data element, where the configuration data element comprises configuration information specifying the characteristics to be verified by the hardware parameter check module.

In various embodiments, the one or more look-up tables may be stored in a memory and/or registers and the content of the one or more look-up tables may be programmable by the processing unit of the hardware secure element during an initialization/start-up phase.

In various embodiments, the look-up tables may comprise a first look-up table configured to provide the configuration data element as a function of a preset signal, and a second look-up table configured to determine the preset signal as a function of the command field and the parameter index.

In various embodiments, the hardware parameter check module comprises a zero-value check circuit. In this case, the configuration data element may comprise configuration information for selectively enabling the zero-value check circuit. For example, the zero-value check circuit, when enabled, may verify whether the parameter corresponds to a zero value, and generate an error flag when the parameter does not correspond to a zero value.

In various embodiments, the hardware parameter check module may comprise a maximum value check circuit. In this case, the configuration data element may comprise configuration information for selectively enabling the maximum value check circuit. For example, the maximum value check circuit, when enabled, may verify whether the parameter is greater than a maximum value, and generate an error flag when the parameter is greater than the maximum value. In various embodiments, the configuration data element may also comprise this maximum value.

In various embodiments, the hardware parameter check module may comprise an address alignment check circuit. In this case, the configuration data element may comprise configuration information for selectively enabling the address alignment check circuit. For example, the address alignment check circuit, when enabled, may verify whether the parameter is a multiple of a given integer number, and generate an error flag when the parameter is not a multiple of this given integer number. In various embodiments, the configuration data element may comprise configuration information identifying this given integer number.

In various embodiments, the hardware parameter check module may comprise a memory check circuit. In this case, the configuration data element may comprise configuration information for selectively enabling the memory check circuit. For example, the memory check circuit, when enabled, may compare the parameter (expected to contain, e.g., a start address) with one or more reference memory addresses in order to verify whether the parameter contains an address belonging to a memory area addressable by the processing unit, and generate an error flag when the comparison indicates that the parameter does not contain an address belonging to a memory area addressable by the processing unit. In various embodiments, the configuration data element comprises configuration information identifying this one or more reference memory addresses.

In various embodiments, at least one further parameter indicating a quantity of data. In this case, the configuration data element may comprise configuration information identifying the parameter index of this further parameter and configuration information for selectively enabling an end-address verification. In this case, the memory check circuit, when the end-address verification is enabled, may calculate an end-address as a function of the parameter and the further parameter. Next, the memory check circuit may compare also the end-address with one or more reference memory addresses in order to verify whether the end-address belongs to a memory area addressable by the processing unit, and generate an error flag when the comparison indicates that the end-address does not belong to a memory area addressable by the processing unit. In various embodiments, the calculating of the end-address may also include that the value of the further parameter indicating a quantity of data is converted into a value identifying a number of memory location.

In various embodiments, the various error flags (being indicative of one or more parameter errors) may be provided to a message handler module of the hardware secure element.

For example, in various embodiments, the hardware secure element comprises a microprocessor and a (program) memory, such as a non-volatile memory, having stored a plurality of software routines executable by the microprocessor, where each software routine starts at a respective memory start address. For example, the software routines may comprise: a plurality of command handlers comprising software instructions for performing operations using a secret key, such as an encryption or decryption operation using a respective cipher key; an optional default handler, e.g., to be used when the value of the command is greater than the number of the command handlers; and/or one or more error handlers, e.g., to be used when a transmission error occurred.

The hardware secure element may also comprise a (software or hardware) message handler module configured to elaborate the command and the error flags generated by the hardware parameter check circuit in order to determine a software routine (among the software routine stored in the memory) to be executed by the microprocessor. Next, the hardware message handler module may provide data to the microprocessor indicating the software routine to be executed. For example, in various embodiments, the hardware secure element may comprise for this purpose a look-up table, which permits to associate a respective software routine to each command. For example, in various embodiments, the elements of the look-up table contain the memory start addresses of the software routines.

In various embodiments, the hardware secure element may be part of a more complex processing system, such as an embedded system or preferably an integrated circuit, such as a microcontroller. In this case, the processing system comprises also a transmitter circuit for transmitting data to the receiver circuit of the hardware secure element and a non-secure processing unit. Generally, the non-secure processing unit may not have direct access to the (program) memory of the hardware secure element, e.g., the non-secure processing unit does not have access to the cipher keys stored in the memory of the hardware secure element. However, the non-secure processing unit may request the execution of security services by transmitting via the transmitter circuit a command to the hardware secure element.

BRIEF DESCRIPTION OF THE DRAWINGS

Embodiments of the present disclosure will now be described with reference to the annexed drawings, which are provided by way of non-limiting example and in which:

FIG. 15 shows an embodiment of the preset configuration information of FIGS. 13 and 14;

FIG. 16 shows an embodiment of a configuration data elements stored in the configuration data memory of FIGS. 12, 13 and 14;

DETAILED DESCRIPTION OF ILLUSTRATIVE EMBODIMENTS

In the following description, numerous specific details are given to provide a thorough understanding of embodiments.

The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
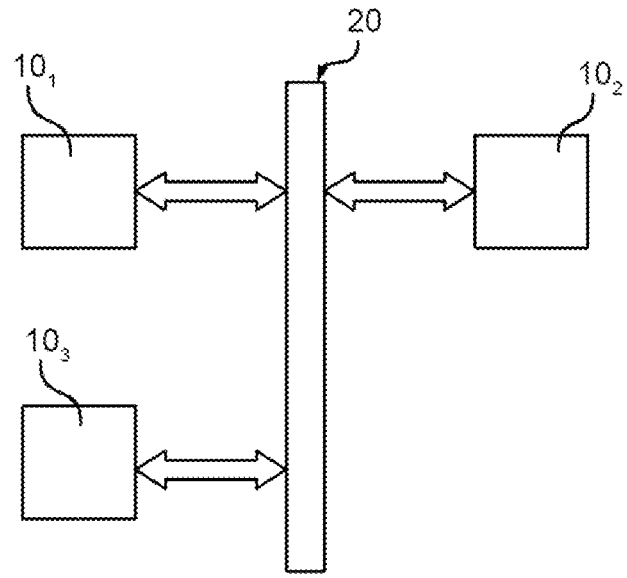
FIGS. 1 and 2 show typical processing systems comprising a hardware secure element.
Figure 2:
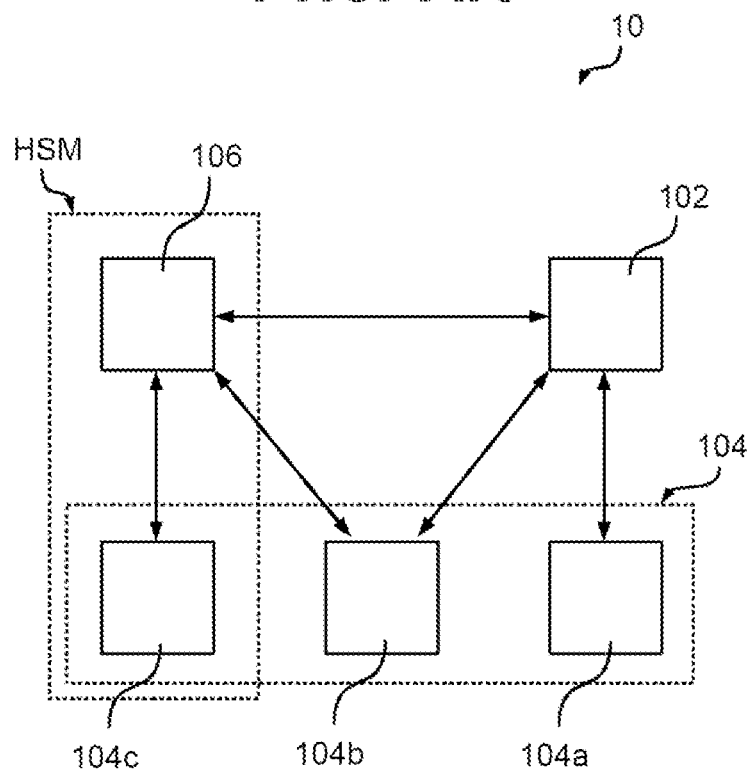

In the following FIGS. 3 to 18, parts, elements or components which have already been described with reference to FIGS. 1 and 2 are denoted by the same references previously used in such Figures; the description of such previously described elements will not be repeated in the following in order not to overburden the present detailed description.

Figure 3:
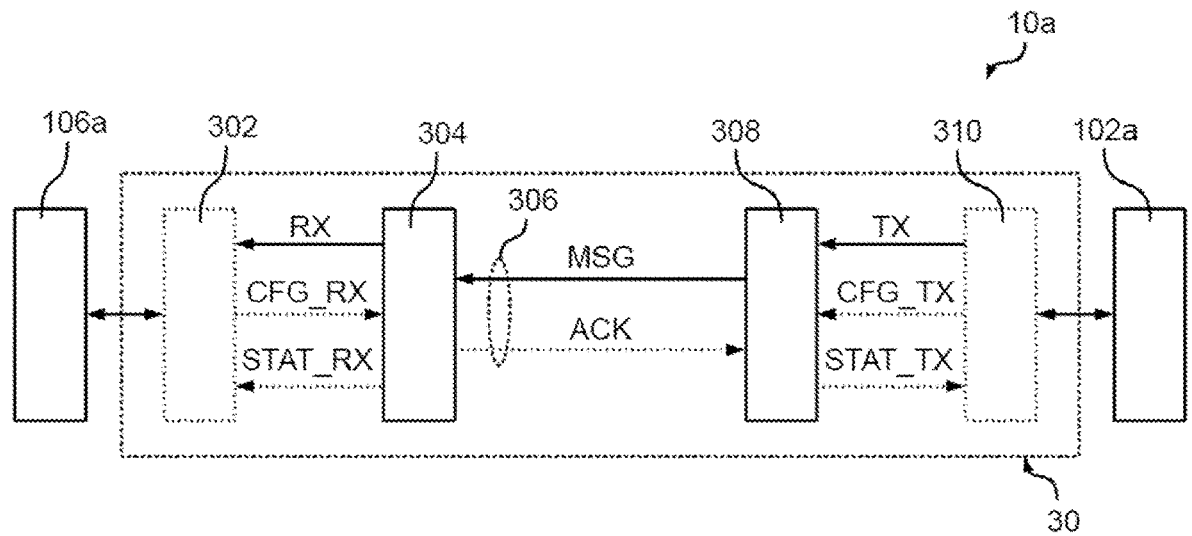
FIG. 3 shows an embodiment of a processing systems in accordance with the present disclosure.

FIG. 3 shows a first embodiment of a processing system 10a configured to transmit data from a non-secure element to a secure element. As mentioned in the foregoing, the processing system 10a may be an embedded system or preferably an integrated circuit, such as a micro-controller, comprising one or more non-secure elements and a secure element.

In various embodiments, the non-secure element(s) comprise a processing unit 102a, such as a micro-processor (usually the CPU) programmed via software instructions. Similarly, the secure element comprises a processing unit 106a, such as a second micro-processor or a custom hardware module, where the second processing unit 106a is configured to execute security functions being based on at least one encryption key, such as encryption and/or decryption operation.

In the embodiment considered a transmission system 30, referred to as HSM Mailbox sub-system, is used to transmit data from the non-secure processing unit 102a to the secure processing unit 106a. Generally, the communication between the non-secure processing unit 102a and the secure processing unit 106a is usually bi-directional. While in the following will be discussed mainly the transmission from the non-secure processing unit 102a to the secure processing unit 106a, a similar communication may also be used for the transmission from the secure processing unit 106a to the non-secure processing unit 102a.

Specifically, in the embodiment considered, the non-secure processing unit 102a has associated a transmitter circuit 308 and the secure processing unit 106a has associated a receiver circuit 304.

In various embodiments, the non-secure processing unit 102a may provide data to be transmitted TX and/or optional configuration information CFG_TX to the transmitter circuit 308 by storing these data in a register 310. For example, in case the processing system 10a is a microcontroller, the register 310 may be part of the so called Special Function Registers (SFR) of the processing unit 102a, i.e., the register 310 may be addressable via one or more specific addresses in the memory space of the non-secure processing unit 102a. Generally, one or more information STAT_TX in the register 310 may also be written by the transmitter circuit 308, e.g., in order to provide a feedback to the non-secure processing unit 102a concerning the status of the transmission of the data.

Similarly, the receiver circuit 304 may have associated a memory/register 302, in which the receiver circuit 304 may store data RX having been received. Accordingly, the secure processing unit 106a may obtain the data transmitted/received by reading the content of the memory/register 302. Generally, one or more information in the memory/register 302 may also be written by the secure processing unit 106a, e.g., in order to set one or more configuration information CFG_RX to be used by the receiver circuit 304. Generally, the receiver circuit 304 may store also one or more additional information STAT_TX in the memory/register 302, e.g., data concerning the status of the transmission/reception of data. For example, the additional information STAT_TX may be used to determine a transmission error.

Generally, the transmitter circuit 308 and the receiver circuit 304 may exchange data via any suitable communication channel 306, e.g., including one or more electric wires. Moreover, the communication may be based on any synchronous or asynchronous communication protocol.

For example, in various embodiments an asynchronous communication protocol is used, such as the Secure Hardware Extension (SHE) protocol.

For example, in various embodiments, the transmitter circuit 308 is configured to transmit a data packet MSG, referred to as HSM Message, to the receiver circuit 304. For example, in various embodiments, the data packet MSG comprises frames of 32-bit, which are transmitted through a 32-bit bus, such that one frame at a time can be transmitted. Generally, the register 310 may also be a First-In First-Out (FIFO) system, thereby permitting that a plurality of consecutive frames can be transmitted in sequence. Preferably, the receiver circuit 304 sends an acknowledge ACK (or negative-acknowledgement) to the transmitter circuit 308, e.g., in order to inform the transmitter circuit 308 that the transmission channel 306 is available.

For example, in various embodiments, the data packet MSG may comprise the following fields: a command field CMD; an optional context field, e.g., in order to identify a given encryption context; and one or more optional parameters P.

Figure 4:
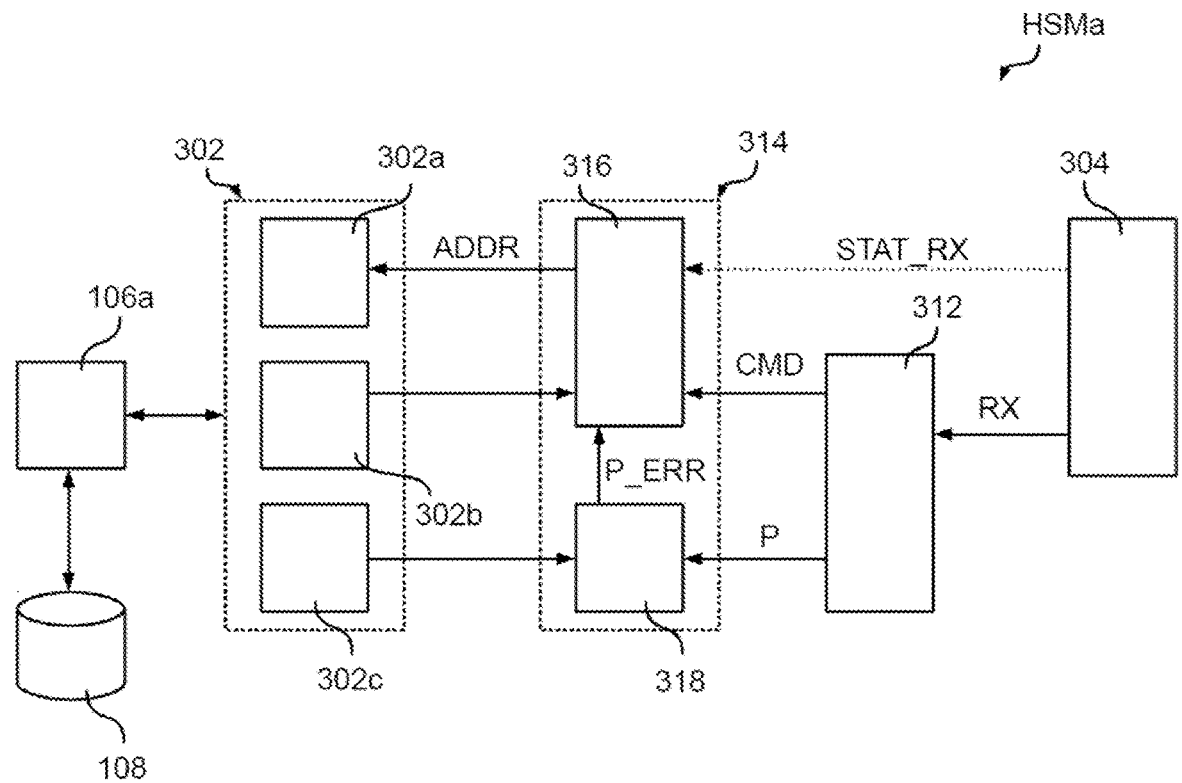
FIG. 4 shows an embodiment of a hardware secure element comprising a message handler module and a parameter check module.

FIG. 4 shows a first embodiment of the implementation of a secure element HSMa in accordance with the present disclosure.

Specifically, as mentioned in the foregoing, the secure element HSMa comprises the processing unit 106a and the receiver circuit 304, which exchange data via the memory/register 302.

Specifically, in the embodiment considered, the receiver circuit 304 has associated a buffer 312 in which the received data RX are stored. Accordingly, the buffer 312 (which may also be integrated in the receiver circuit 304) comprises the content of the transmitted message MSG, in particular the command CMD and the other optional fields, such as the parameters P.

In the embodiment considered, the command CMD is provided to a message handler module 316. Similarly, the parameter field P may be provided to a parameter check module 318, which is configured to determine whether the parameters P are valid. In various embodiments, the message handler module 316 and/or the parameter check module 318 may be integrated in a dedicated hardware module 314, i.e., these modules may be implemented with combinational and/or sequential logic blocks.

In various embodiments, the memory/register 302 comprises various memory areas, each comprising one or more bits. In this case, a bit sequence 302c in the memory/register 302 may comprise data representing configuration information for the parameter check. Accordingly, the parameter check module 318 may use the bit sequence 302c together with the parameters P in order to determine whether the parameters P are valid and possibly signal an error P_ERR to the message handler module 316.

Accordingly, in the embodiment considered, the non-secure processing unit 102a may send a command CMD to the secure element HSMa, which identifies a service to be executed, and (optionally if needed) several parameters, which characterize how the service should be accomplished.

For example, the services provided by the secure element HSMa may include one or more encryption/decryption service. For example, the service requested may be identified with 1 byte, which identifies the command CMD. For example, the command field may identify a decryption or encryption operation and a respective cryptographic key (e.g., selected from a plurality of different encryption algorithms and/or cryptographic keys) to be used to encrypt/decrypt the data. For example:

if the command byte is set to 0, the secure element will return an encrypted version of the 16 bytes, with the cryptographic key number 0, if the command byte is set to 1, the secure element will return a decrypted version of the 16 bytes, with the cryptographic key number 0, if the command byte is set to 2, the secure element will return an encrypted version of the 16 bytes, with the cryptographic key number 1, and so on.

Further bytes (e.g., up to 16 bytes) may identify the parameters P, e.g., the data to be encrypted/decrypted. Generally, as will be described later on, the parameter field P does not necessarily contain the data to be processed, but the parameters P can contain a pointer to a memory where the data to be processed are located and/or where the processed data should be written to.

Once the secure element HSMa has received the command and the parameters, the requested service may be run.

Generally, the message handler module 316 is configured to analyze the command field CMD and send an instruction to the processing unit 106a.

For example, in various embodiments, the processing unit 106a is implemented with a microprocessor having associated a memory 108 (typically a non-volatile memory, such as a flash memory or EEPROM) containing the instructions to be executed by the processor 106a (i.e., the firmware). In this case, the memory/register 302 may comprises a memory area 302a in which the message handler module 316 may store data identifying (directly or indirectly) an instruction address ADDR of the microprocessor 106a, i.e., an address of the memory 108.

For example, a hardware message handler 312 may analyze the command field CMD and determine the respective function to be executed, e.g., a respective start address of the function. For example, the message handler may use a Look-up Table (LUT) for this purpose, where each command CMD is associated a respective start address ADDR. Accordingly, the message handler 316 may determine the respective start address ADDR of the function to be executed and write the address ADDR in the memory area 302a.

In this case, the microprocessor 106a may be configured (e.g., via software instructions) to read the content of the memory area 302a, for example periodically or in response to an interrupt generated by the message handler 316, and perform a jump to the corresponding address ADDR stored therein.

Generally, the memory area 302a may also correspond directly to a general-purpose register of the microprocessor 106a.

Conversely, in case the message handler module 316 is implemented with a software function, i.e., a sequence of instructions executed by the microprocessor 106a, the software function may directly perform a jump operation to the address ADDR. Moreover, the message handler module 316 may be implemented with a sub-routine and the address ADDR may be provided as return value of the sub-routine.

In various embodiments, the memory 108 may also contain one or more error functions, again having associated a respective start-address. In this case, the message handler module 316, once having determined an error (e.g., an error in the parameters P signaled via the signal P_ERR or a transmission error signaled via the signal STAT_RX), may write the start-address ADDR of a respective error function into the memory area 302a.

In various embodiments, a bit sequence 302b in the memory/register 302 may comprise also data representing configuration information for the message handler module 316, e.g., data identifying the start-addresses of the various functions stored in the memory 108. Accordingly, the message handler module 316 may use the bit sequence 302b together with the command CMD in order to determine a respective start-address ADDR.

In the embodiment discussed before, the service is managed by the microprocessor 106a, which executes a sequence of instructions stored in the memory 108. Accordingly, given that each service is accomplished by different sub-routine/function consisting in a sequence of instructions located in the memory 108, the (software or hardware) message handler module 316 determines which instruction sequence or software function (hereafter called service handler) has to be executed.

In addition to selecting the proper service handler, the message handler module 316 may also take in account that errors can occur. For example, in various embodiments, such errors are again managed by the microprocessor 106a, which executes a respective error handler/function, i.e., a further sequence of instructions stored in the memory 108.

If the message handler module 316 is implemented by software, i.e., by a further function executed by the microprocessor 106a, the respective function parses the command CMD and determines, e.g., via a service handler look-up table (located, for example, in the non-volatile memory 108) the address of the respective service handler. Generally, not every command may have associated a unique service handler, but a plurality of commands CMD may be assigned to the same function, such as a "default" handler.

Starting from the time the non-secure element initiates a service request, the HSM Mailbox communication system 30 may monitor several conditions in order to determine a correct transmission of the message MSG. For example, the transmitter circuit 308 may determine whether the transmission channel is available at the time the service request is started, the receiver circuit 304 may determine whether the transmitted/received data bits are corrupted (e.g., by generating the signal STAT_RX based on one or more parity bits in the transmitted message MSG), the parameter check module 318 may determine whether the parameters P are correct, etc.

Accordingly, the secure element HSMa, in particular the receiver circuit 304 and the parameter check module 318, may monitor different error conditions, which may be signaled to the message handler module 316. Generally, the various error conditions may also be classified. For example, an error may be classified as "hard", when the error depends on a malfunction of the HW (e.g., based on the signal STAT_RX indicating that some bits got corrupted during the transfer from the non-secure to the secure element), or "soft", when the error is due to a wrong message created by the non-secure processing unit 304 (e.g., when the signal P_ERR indicates that the message parameters P are wrong, e.g., because the parameters P are not compatible with the requested service). In various embodiments, such errors are treated differently, e.g., a hard error may be handled by a first error function and the soft error may be handled by a second error function.

Figure 5:
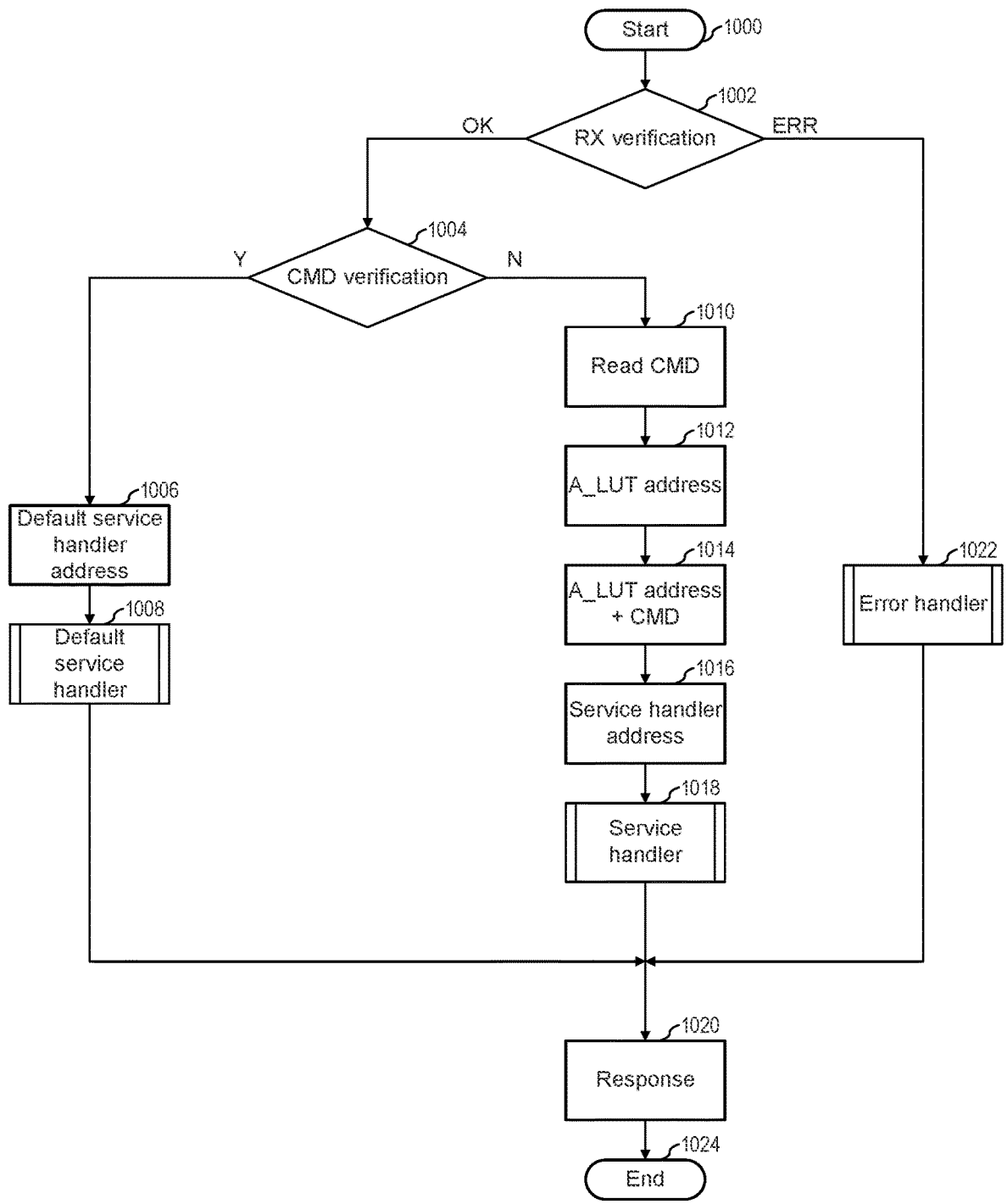
FIG. 5 illustrates a flow-chart of an embodiment of a message handler module.

FIG. 5 shows a flow chart of possible software implementation of the message handler 316, i.e., the operations executed by the microprocessor 106a used to retrieve the service handler address and check for possible errors.

After a start step 1000, the microprocessor 106a executes a first routine at a step 1002 in order to determine whether the received data RX contain an error (e.g., by analyzing the signals STAT_RX and P_ERR).

In case the received data do contain errors (output "ERR" of the verification step 1002), the microprocessor 106a starts at a step 1022 an error handler, e.g., jumps to an address associated with an error handler. Generally, the microprocessor 106a may also determine the type of error at the step 1022 (e.g., hard or soft) and jump to a respective error handler.

Conversely, in case the received data do not contain errors (output "OK" of the verification step 1002), the microprocessor proceeds to a following verification step 1004 in order to determine whether the command CMD received is associated with the default service handler.

In case the command CMD is associated with the default service handler (output "Y" of the verification step 1004), the microprocessor 106a obtains at a step 1006 the address of the default service handler and executes at a step 1008 the default service handler, e.g., by jumping to the address of the default service handler.

Conversely, in case the command CMD is not associated with the default service handler (output "N" of the verification step 1004), the microprocessor 106a reads at a step 1010 the value or the command field CMD.

Next, the microprocessor 106a obtains the address of the service handler associated with the command CMD. For example, in the embodiment considered, the microprocessor 106a obtains at a step 1012 the start address of a Look-up table, adds at a step 1014 the value of the command CMD to the start address of a Look-up table and reads at a step 1016 the service handler address stored at the resulting memory position.

Finally, the microprocessor 106a executes at a step 1018 the service handler, e.g., by jumping to the service handler address read at the step 1016.

In various embodiments, the various handlers (error, default and service) prepare a response message. Accordingly, once the various handlers/function have finished, the microprocessor 106a may send at a step 1020 a response to the non-secure processing unit 102a and the procedure terminates at a step 1024. Generally, the step 1020 may also be implemented within the various (error, default, service) functions.

Accordingly, the above operations, when implemented in software, may require a significant amount of software instructions, which can severely impact the latency. Moreover, in full-duplex communications (which is the case, for example, when using the Secure Hardware Extension (SHE) protocol for the communication between a secure and non-secure element), the steps shown in FIG. 5 may be required two times: one time when the secure element HSMa receives the service request and has to look-up the proper handler, and one time when the non-secure element receives the answer.

Figure 6:
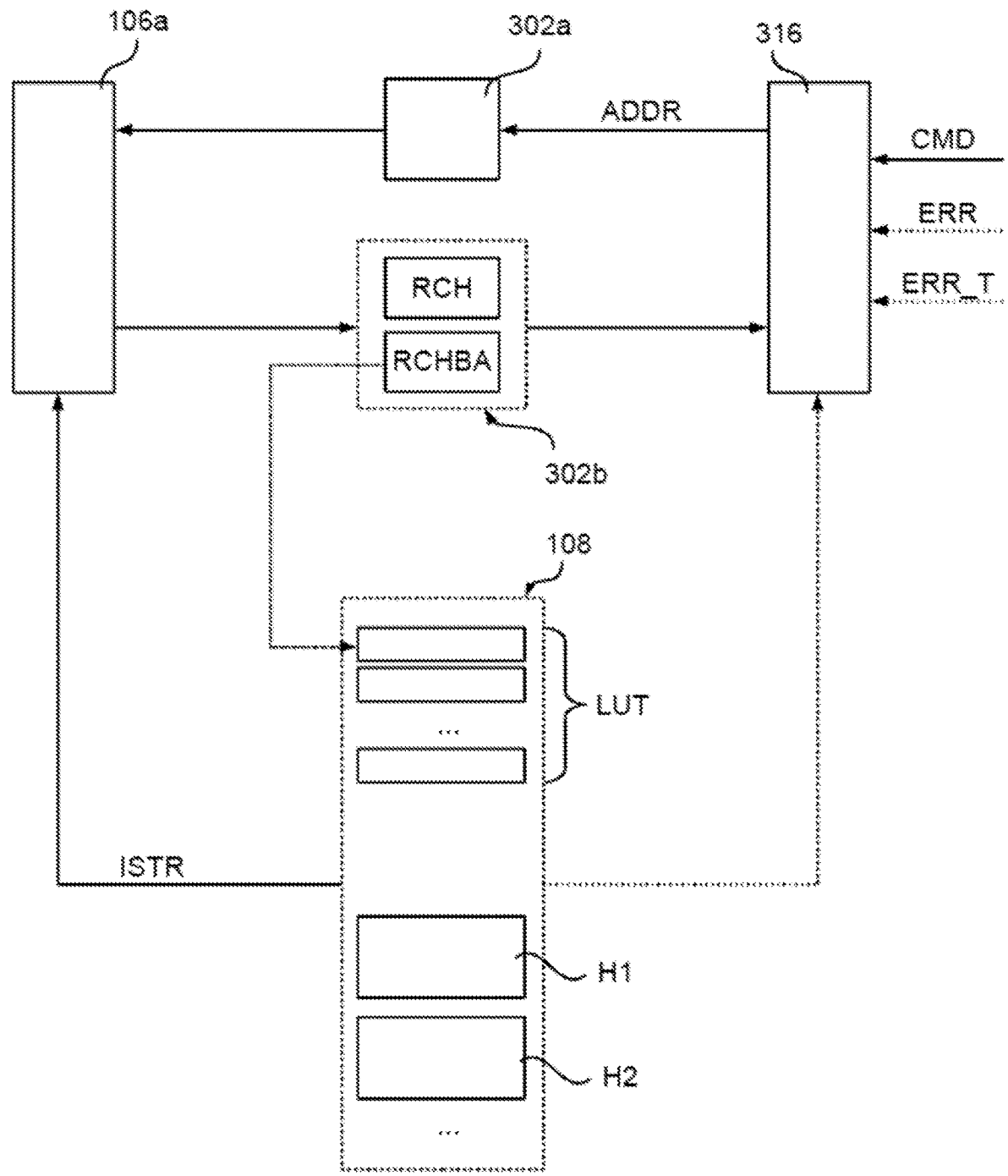
FIG. 6 shows an embodiment of a hardware secure element comprising a software programmed microprocessor and a message handler module.

FIG. 6 shows a second embodiment of the secure module HSMa, where the message handler module 316 has been implemented as a dedicated hardware module. Specifically, in the embodiment considered, the hardware message handler module 316: may calculate the service handler address ADDR in hardware, thereby minimizing the latency of the operation; may support various different error handlers based on the error type ERR_T (such as two error types classified as soft and hard, e.g., determined as a function of the signals P_ERR and STAT_RX), thereby avoiding additional software code and latency; reduces the power consumption; and may support a default handler, which is executed, e.g., when the received command CMD falls within a certain range.

As described with respect to FIG. 4, in various embodiments, the message handler module 316 uses a look-up table in order to obtain the service handler associated with a given command.

Specifically, in the embodiment considered, this look-up table LUT is stored in the non-volatile memory 108, in which are also stored the instructions executed by the microprocessor 106a, e.g., the (flash or EEPROM) program memory of the microprocessor 106a. Accordingly, each entry in the look-up table LUT contains the start-address of one of a plurality of handlers/functions H1, H2, etc., (also stored in the memory 108) to be executed by the microprocessor 106a.

Figure 7:
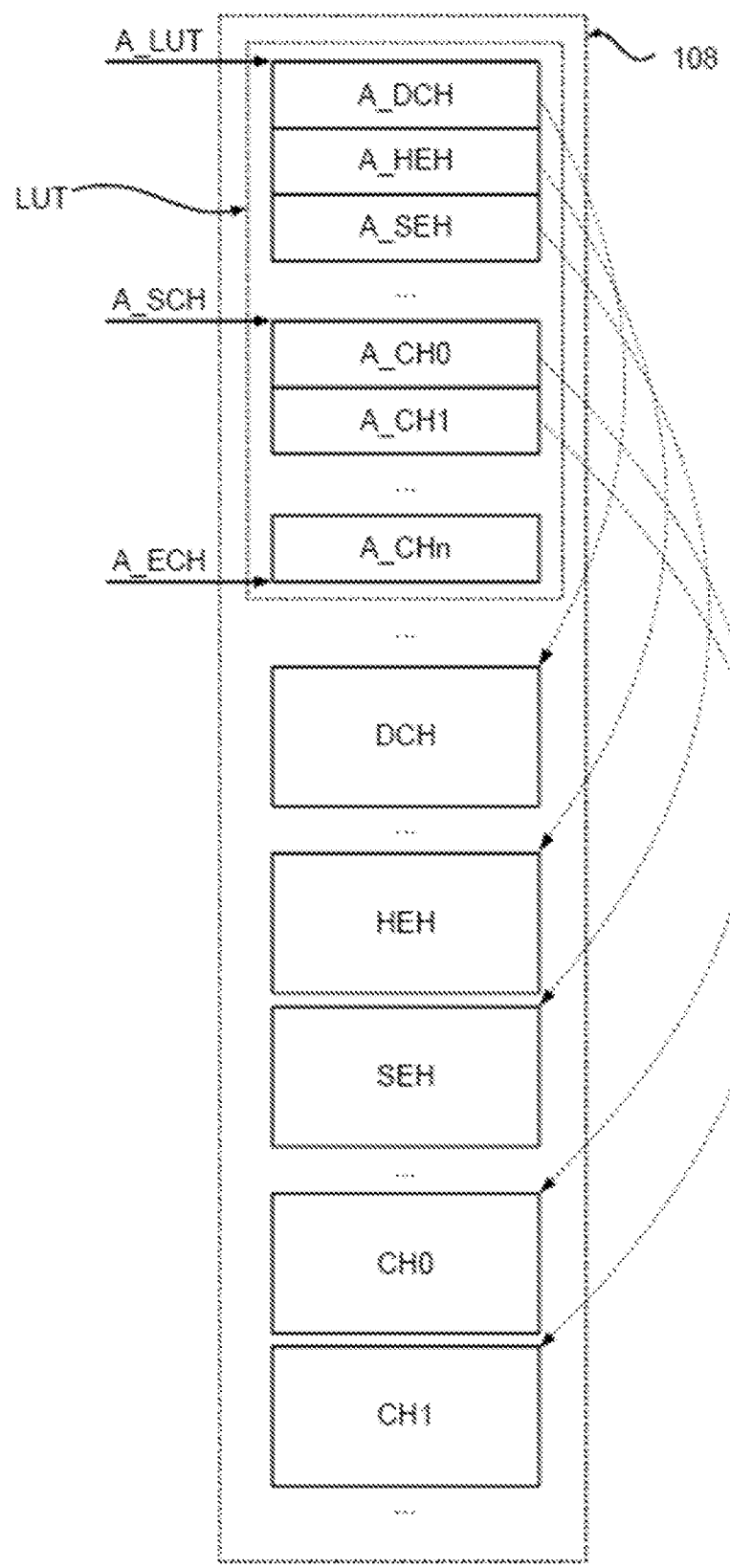
FIG. 7 shows an embodiment of the memory organization of the microprocessor of FIG. 6.

FIG. 7 shows in this regard an embodiment of the data stored in the memory 108.

In the embodiment considered, the memory 108 contains the look-up table LUT and a plurality of handlers/functions, such as a default command handler DCH, one or more error handlers, such as a hard error handler HEH and a soft error handler SEH, and one or more command handlers CH0, CH1, etc.

In the embodiment considered, the look-up table LUT starts at a given start address A_LUT, and each of the elements of the look-up table LUT contains the start address for a respective of handler/function, i.e., sequence of instructions.

For example, in various embodiments, the look-up table LUT contains, in sequence: the start-address A_DCH for the default command handler DCH; the start-addresses for the one or more error handlers, such as a start-address A_HEH for the hard error handler HEH and a start-address A_SEH for the soft error handler SEH; and the start-addresses A_CH0, A_CH1, . . . A_CHn, for the one or more command handlers CH0, CH1, etc.

Accordingly, in the embodiment considered, the first command handler address A_CH0 is stored at a given memory address A_SCH and the last command handler address A_CHn is stored at a given memory address A_ECH.

Generally, the various elements in the look-up table LUT may also have a different order. However, it is preferably to store the addresses/elements in the table LUT belonging to the same group of handlers, i.e., default command handler, error handler(s), command handler(s), in sequence.

Moreover, generally, each element in the look-up table may be stored in a plurality of consecutive memory locations N_LOC. For example, each location in the memory 108 may consist of 1 byte, while the processing unit 106a may use addresses having 4 bytes for accessing the memory 108. For example, this is usually the case for an 8-bit microprocessor with 32-bit memory space. Accordingly, in this case, each element in the look-up table LUT would consist in N_LOC=4 consecutive memory locations.

Accordingly, generally, the default handler address A_DCH is stored at a given memory address A(A_DCH), where:

$$A(A\_DCH)=A\_LUT+OFFSET\_DCH \times N\_LOC.$$

For example, in the embodiment shown in FIG. 7, the offset OFFSET_DCH is 0.

Similarly, the addresses of the error handlers, e.g., A_HEH and A_SEH, start at a given memory address:

$$A\_LUT+OFFSET\_EH \times N\_LOC.$$

For example, in the embodiment shown in FIG. 7, the offset OFFSET_EH is 1. For example, in the embodiment considered, the hard error handler address A_HEH is stored at the memory position A(A_HEH), where:

$$A(A\_HEH)=A\_LUT+OFFSET\_EH \times N\_LOC$$

and the soft error handler address A_SEH is stored at the memory position A(A_SEH), where:

$$A(A\_SEH)=A\_LUT+(OFFSET\_EH+1) \times N\_LOC.$$

Finally, the addresses of the command handlers start at a given memory address A_SCH, where:

$$A\_SCH=A\_LUT+OFFSET\_CH \times N\_LOC.$$

For example, in the embodiment shown in FIG. 7, the offset OFFSET_CH is 3. For example, in the embodiment considered, each command handler address A_Ch$_i$, with i=0 . . . n, is stored at a respective memory position A(A_Ch$_i$), where:

$$A(A\_Ch_i)=A\_SCH+i \times N\_LOC.$$

Accordingly, in the embodiment considered, the look up table is stored together with the handlers in the memory 108, i.e., the memory of the secure element HSMa. Each table element contains the address of a respective service/handle to be executed, where each table element may comprise a plurality of memory locations based on the CPU/memory architecture. For example, in the embodiment considered (8-bit microprocessor with 32-bit memory space), each table element contains N_LOC=4 rows/memory locations, and, accordingly, the table elements are displaced by N_LOC=4 memory locations.

Accordingly, once having determined the value of the command field CMD, the message handler module 316 is able to calculate the address of the corresponding table elements of the look-up table LUT as shown in the foregoing. In the embodiments considered, the message handler module 316 has to know (implicitly or explicitly) the following information: the value N_LOC, which is fixed for a given CPU architecture; the various offset values OFFSET_DCH, OFFSET_EH and OFFSET_CH, which are preferably fixed (e.g., in case the number of error handlers is fixed); and the number n of command handlers, which may be variable based on the security services supported.

Generally, the above information, or equivalent data identifying this information univocally, may be stored in the memory/register 302b containing the configuration information for the message handler module 316. For example, the value N_LOC may be fixed by hardware and the data A_LUT, A_SCH and A_ECH may be stored in the memory/register 302b.

Conversely, in the embodiment shown in FIG. 6, the memory/register 302b comprises a first memory area RCHBA, in which is stored the base address of the look-up table LUT, i.e., the start-address A_LUT. Moreover, the memory/register 302b comprises a second memory area RCH, in which is stored the number n of command handler functions. Thus, knowing the number of error handlers, which is assumed to be fixed in the embodiment considered, the offset values OFFSET_DCH, OFFSET_EH and OFFSET_CH are constant and may be preconfigured (together with the value N_LOC) within the message handler module 316.

Accordingly, the register RCHBA provides the start-address A_LUT of the look-up table LUT. In various embodiments, the content of this register RCHBA (and similarly the register RCH) may be written by the microprocessor 108a during an initialization routine. Moreover, with the specific organization of the look-up table LUT, the message handler module 316 can determine the start-address A_SCH by a simple calculation, because the offset OFFSET_CH is fixed, e.g., A_LUT+3×N_LOC, where the value A_LUT is stored in the register RCHBA, and the value 3×N_LOC may be fixed at a hardware level within the message handler module 316. Finally, the message handler module 316 may also determine the end-address A_ECH of the look-up table LUT based on the content of the register RCH, which contains the number n of command handlers.

Accordingly, once the message handler module 316 receives a given command (or a (hard or soft) error ERR from the receiver circuit 304 and/or the parameter check module 318), the message handler module 316 may determine the respective (default, error or command) handler. Next the message handler module 316 may calculate the start-address of the respective element in the look-up table LUT associated with the handler.

For example, in various embodiments, the message handler module 316 may determine whether an error occurred, e.g., by analyzing the signal ERR. In case an error occurred, the message handler module 316 may set the start address for the element in the look-up table LUT to:

in case a hard error occurred, RCHBA+N_LOC; and
in case a soft error occurred, RCHBA+2×N_LOC.

Conversely, in case no error occurred, the message handler module 316 may read the content of the command field CMD and calculate the corresponding start-address for the element in the look-up table LUT. For example, in various embodiments, the values of the command field CMD are numbered from 0 to n−1. In this case, the message handler module 316 may determine whether the value of the command field CMD is smaller than the value stored in the register RCH (containing the number n of command handlers).

In case the value of the command field CMD is smaller than the value stored in the register RCH (CMD<RCH), the message handler module 316 may calculate the start-address for the element in the look-up table LUT, e.g., based on the following equation:

$$RCHBA+OFFSET\_CH \times N\_LOC+CMD \times N\_LOC.$$

For example, as mentioned before the OFFSET_CH may correspond to 3.

Generally, the values of the command field CMD may also be offset, and the command CMD may be in the range from OFFSET_CH to (n−1+OFFSET_CH), thereby avoiding the offset compensation. Preferably, in this case, the value stored in the register RCH is also compensated, e.g., by storing the value (n+OFFSET_CH) in the register RCH.

In case the value of the command field CMD is equal or greater than the value stored in the register RCH (CMD>=RCH), the message handler module 316 may generate an error or preferably use the default handler. For example, in various embodiments, the message handler module 316 uses as start-address for the element in the look-up table LUT the value stored in the register RCHBA.

In various embodiments, the message handler module 316 may thus read the address stored in the respective memory locations assigned to the element of the look-up table LUT and store the data read in the memory/register 302a. For example, in this case, the memory 108 may be a dual-port memory permitting contemporaneous access by the microprocessor 106a and the message handler module 316. In fact, a parallel access to the memory 108 may be implemented usually quite easily, e.g., by storing the look-up table LUT in a different flash page with respect to the handlers/functions H1, H2, etc.

However, in various embodiments, the message handler module 316 may directly write the start address of the respective element in the look-up table LUT in the memory/register 302a. Accordingly, in this case, the memory/register 302a contains the address of the element in the look-up table LUT (and not the address stored at the corresponding position in the look-up table LUT), and the microprocessor 106a may perform a jump to the respective handler by reading the content of the corresponding memory location in the look-up table LUT. This embodiment has the advantage that the message handler module 316 does not have to access the memory 108. Accordingly, the memory 108 does not require a second read interface. Moreover, the message handler module 316 may directly determine the start address of the element in the look-up table LUT by combinational operations (requiring usually a single clock cycle).

Accordingly, the microprocessor 106a may read via software instructions the content of the memory/register 302a. Specifically, in this case the memory/register 302a contains directly the handler address, the microprocessor 106a may perform a jump to the address stored in the memory/register 302a.

Conversely, in case the memory/register 302a does not contain directly the address to which the microprocessor 106a should jump, but the address of (i.e., a pointer to) a memory location containing the address to which the microprocessor 106a should jump, the microprocessor 106a reads first the content of the memory location associated with the address stored in the memory/register 302a, i.e., the element in the look-up table LUT, and then performs a jump to the corresponding address stored therein.

Figure 8:
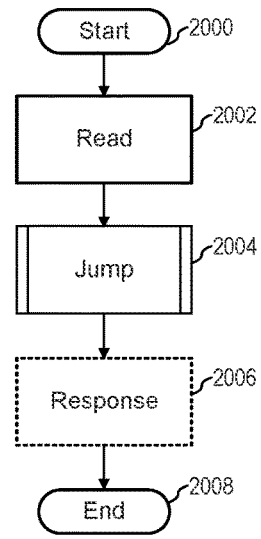
FIG. 8 illustrates a flow-chart of an embodiment of a software executed by the microprocessor of FIG. 6 in order to determine a handle/function.

For example, FIG. 8 is a flow chart showing an embodiment of the software instructions to be executed by the microprocessor in order to start the handler. Specifically, after a start step 2000 (which may be activated, e.g., periodically or by an interrupt generated by the message handler 316), the microprocessor 106a reads at a step 2002 the content of the memory/register 302a. Next, the microprocessor 106a reads the handler address from the memory location associated with the address stored in the memory/register 302a (i.e., the content of the look-up table element) and performs at a step 2004 a jump to this handler address.

Once the execution of the handler finishes, the microprocessor 106a may send at a step 2006 a response to the processing unit 102a and the procedure terminates at a stop step 2008. Generally, similar to the step 1020, the step 2006 may also be executed within the various handlers.

Figure 9:
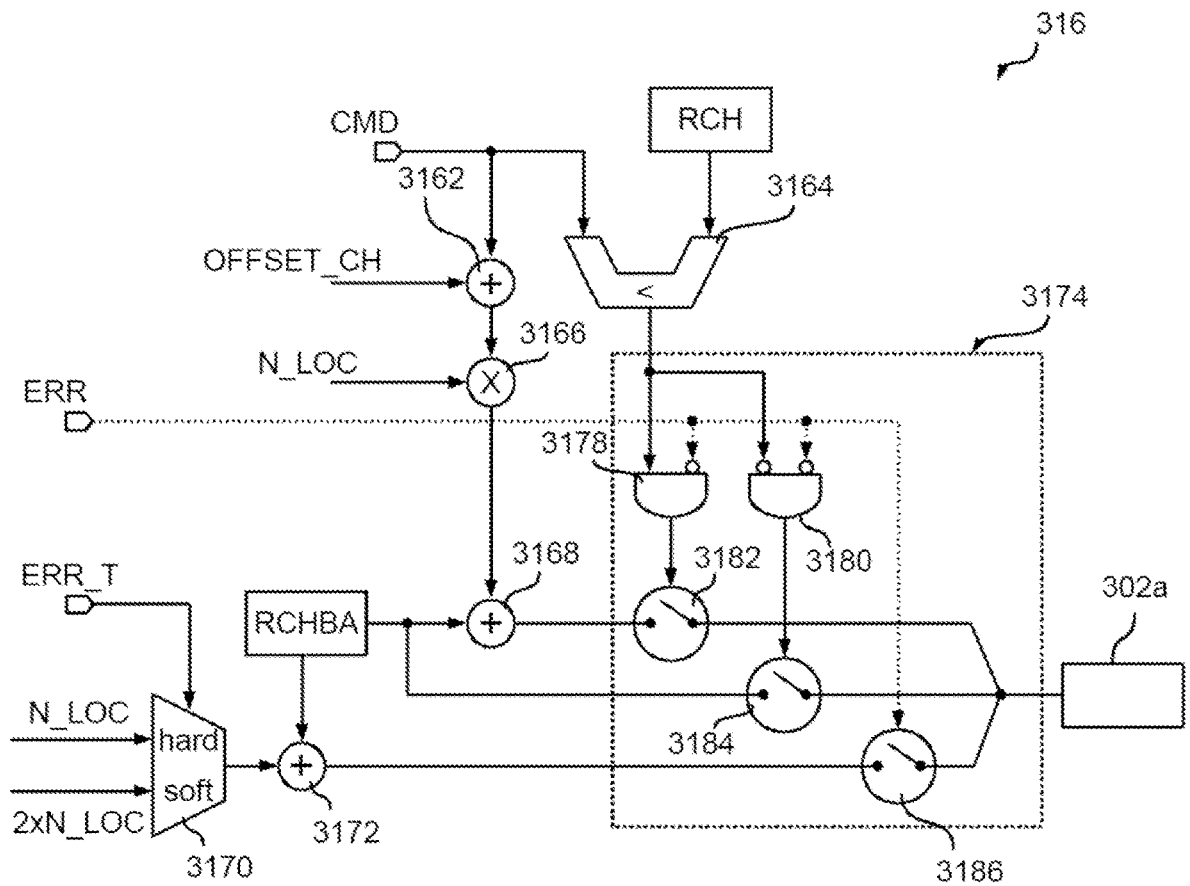
FIG. 9 shows an embodiment of the logic circuit of a hardware implementation of the message handler module of FIG. 6.

FIG. 9 shows a possible embodiment of the hardware message handler module 316.

In the embodiment considered, the module 316 determines in parallel three possible addresses for the look-up table LUT.

Specifically, the module 316 determines, based on the command CMD, a first (command) address for the look-up table LUT by an adder 3162, a multiplier 3166 and a further adder 3168, basically implementing the following equation, already described in the foregoing:

$$(OFFSET\_CH+CMD) \times N\_LOC+RCHBA.$$

As mentioned before, by using appropriate values for the command CMD, the offset compensation (OFFSET_CH) is optional. Accordingly, also the adder 3162 is optional.

Moreover, the module 316 determines, based on an error type ERR_T, a second (error) address for the look-up table LUT by a multiplexer 3170 and an adder, substantially implementing the following equations, already described in the foregoing:

RCHBA+N_LOC, in case a hard error occurred (ERR_T=hard); and

RCHBA+2×N_LOC, in case a soft error occurred (ERR_T=soft).

Moreover, the module 316 determines a third (default) address for the look-up table, corresponding to the address stored in the register RCHBA.

In the embodiment considered, the module 316 comprises moreover a digital comparator 3164 configured to determine whether the value of the command field CMD is smaller than the value stored in the register RCH (CMD<RCH).

In the embodiment considered, the three possible addresses (command, error, default) are provided to a multiplexer 3174, which is configured to provide at its output one of these three possible addresses as a function of the error signal ERR and the signal provided by the comparator 3164.

For example, in the embodiment considered, the multiplexer 3174 comprises a first switch 3182, which is closed via a logic gate 3178 when the signal provided by the comparator 3164 is high and the signal ERR is low, thereby providing at the multiplexer output the first (command) address when no error occurred and CMD<RCH.

Moreover, the multiplexer 3174 comprises a second switch 3184, which is closed via a logic gate 3180 when the signal provided by the comparator 3164 is low and the signal ERR is low, thereby providing at the multiplexer output the third (default) address when no error occurred and CMD>=RCH.

Finally, the multiplexer 3174 comprises a third switch 3186, which is closed when the signal ERR is high, thereby providing at the multiplexer output the second (error) address when an error occurred.

In the embodiment considered, the address provided by the multiplexer 3174 is then stored in the memory/register 302*a*.

Accordingly, in the embodiment considered, a single clock cycle is sufficient in order to determine the handler address, taking into account different commands and optionally different error types, thereby reducing the latency of the message handling procedure.

As described with respect to FIGS. 3 and 4 the data packet MSG transmitted by the transmitter circuit 308 and received by the receiver circuit 604 may comprise the following fields: a command field CMD; an optional context field, e.g., in order to identify a given encryption context; and one or more optional parameters P.

Again, the command CMD identifies the service requested, and the parameter field P specifies how the service shall be accomplished. While the message handler module 316 elaborates the command field CMD (and possible error signals), the parameter check module 318 should elaborate the parameter field P in order to determine whether the parameters P are valid.

Figure 10:
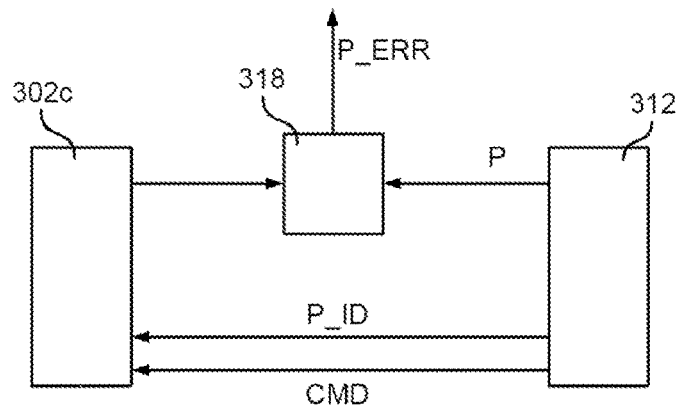
FIG. 10 illustrates a block diagram showing an embodiment of the parameter check module having associate a configuration data memory.

FIG. 10 shows in this regard an embodiment of the parameter check module 318.

Generally, the various security services supported by the secure element HSMa may support different parameters, i.e. the configuration information to be used for the parameter check may vary as a function of the command CMD. For example, the parameters may be mandatory, optional or not even permitted for specific commands CMD.

Moreover, the various security services may support also a different number and type of parameters.

Accordingly, as shown in FIG. 10, the parameter check configuration memory/register 302*a*, may receive at an input the command CMD and information indicating the parameter to be processed, such as a parameter index P_ID, and provide at an output the parameter configuration information to be used by the parameter check module 318.

For example, the memory/register 302*a* may be configured as a memory or look-up table comprising a plurality of parameter configuration information, where the command CMD and the parameter index P_ID are used as address. Generally, the memory/register 302*a* may also have associate combinational circuits, e.g., in order to map a plurality of different commands and/or parameter indices P_ID to the same address.

Again, assuming a very simple encryption service request, the command field CMD could have 1 byte identifying the service requested.

For example, the command CMD could specify whether an encryption or decryption operation should be performed. Moreover, as described in the foregoing, a plurality of different cipher keys may be supported by using a respected different command value. Generally, the index of the cipher key to be used may also be provided as a parameter.

However, instead of directly transmitting the data to be processed, the non-secure processing unit 102*a* and the secure processing unit 106*a* may be connected to a shared memory, such as a Random Access Memory (RAM), preferably a dual-port RAM (see, e.g., block 104*b* in FIG. 2). Accordingly, in this case, the parameter field P may comprise three parameters, each having a given number of bits, e.g., 4 bytes (assuming again a 32-bit memory space): the first parameter identifies the source start-address were the data to be processed (encrypted/decrypted) are stored; the second parameter identifies the destination start-address were the processed data (decrypted/encrypted) should be stored; the third parameter identifies the quantity of data to be processed, e.g., assuming an encryption algorithm operation on 32-bit data, the number of "double-words" (4 bytes).

Before executing any service handler, the secure element HSMa should check the correctness of the received parameters. For example, the secure element HSMa, in particular the parameter check module 318, may verify/test whether the source and destination addresses point to real physical memory locations addressable by the processing unit 106*a*. Moreover, the secure element HSMa may verify/test whether these addresses are aligned to "double-word" locations (again assuming encryption algorithms operation on 32-bit data). The secure element HSMa may also verify/test whether the source end-address and/or destination end-address (both calculated as a function of the respective start-address and the third parameter identifying the quantity of data to be processed) is greater or smaller than the last address of the physical memory.

However, the secure element HSMa may support also one or more further services/commands CMD, such as a request to update the cryptographic key associated with a one or more encryption/decryption services. Accordingly, in this case, the secure element HSMa should be able to receive a new cryptographic key and store the new key, e.g., in the (non-volatile) memory of the processing unit 106a. In this case, the parameter field P (e.g., including directly the new key or the memory location at which the new key is stored) has a different meaning and also the checks to be performed by the parameter check module 318 are different.

Figure 11:
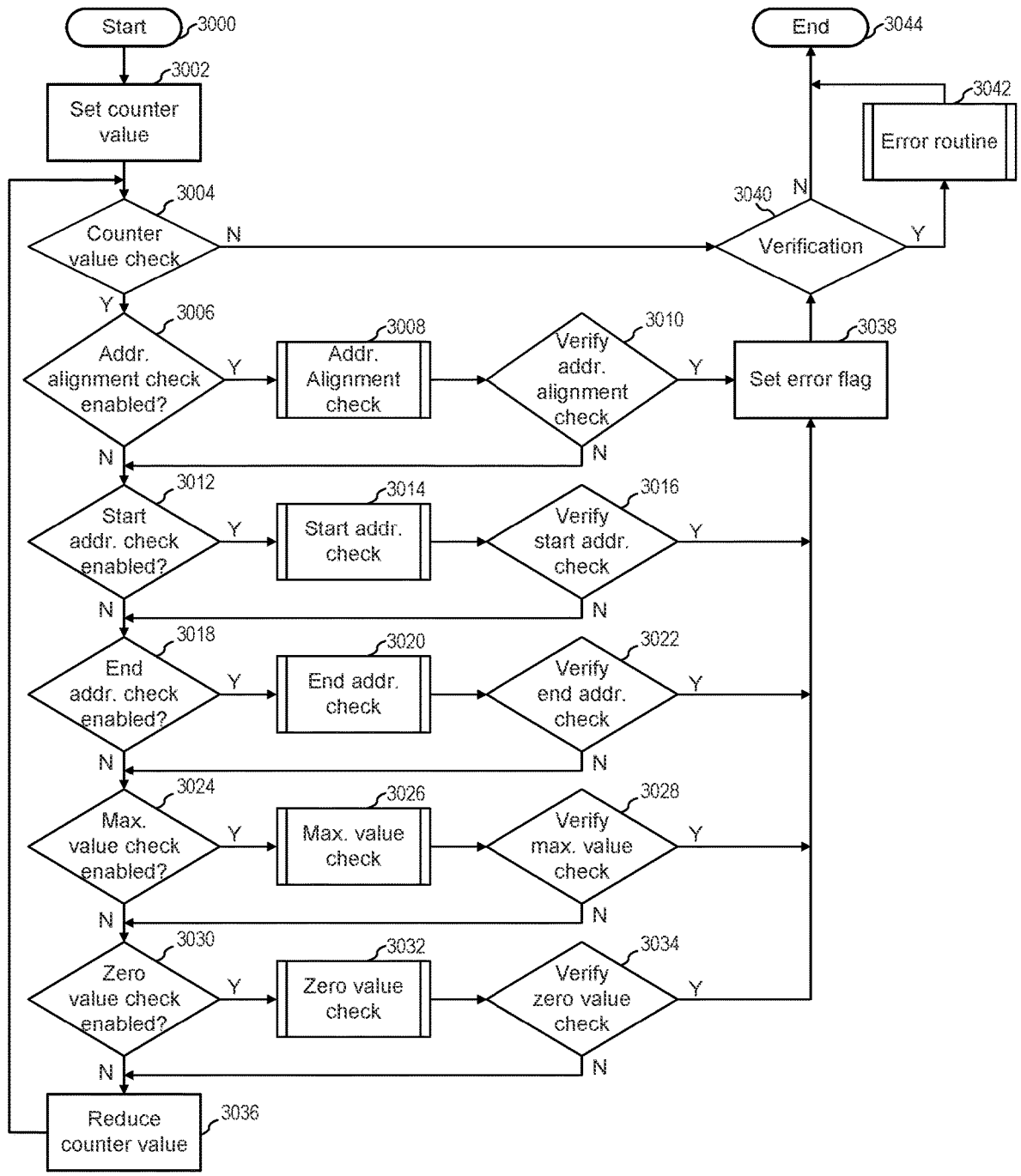
FIG. 11 illustrates a flow-chart of an embodiment of a parameter check module.

For example, FIG. 11 shows a flow-chart of a possible embodiment of the parameter check module 318.

Specifically, in the embodiment considered, the parameter check module 318 supports for each parameter the following five test routines:
  start-address check, e.g., in order to verify whether the start-address points to an addressable physical memory location;
  end-address check, e.g., in order to verify whether the end-address points to an addressable physical memory location;
  address-alignment check, e.g., in order to test/verify whether the (start and/or end) address points to an address with double-word aligned memory location;
  maximum-value check, e.g., in order to test/verify whether a parameter value is smaller than a given maximum value; and zero-value check, e.g., in order to test/verify whether a parameter value is not set to zero.

Accordingly, in the embodiment considered, the configuration memory/register 302c could provide for each command and parameter index P_ID respective configuration, e.g., in the form of a bit sequence, specifying which of these checks should be activated for a given parameter.

For example, in case the parameter currently processed is the first or second parameter (as specified by the parameter index P_ID) containing a (source or destination) start-address, the configuration information 302c could indicate that the parameter check module 318 should execute the start-address, end-address and address-alignment check. Conversely, in case the parameter currently processed is the third parameter (as specified by the parameter index P_ID) containing the quantity of data to be processed, the configuration information 302c could indicate that the parameter check module 318 should execute the maximum-value check.

For example, in the embodiment considered, after a start step 3000, the module 318 sets at a step 3002 a counter value to the number of received parameters.

Next, the module 318 verifies at a step 3004 whether the counter value is greater than 0, i.e., whether at least one parameter has still to be processed.

In case the counter value is greater than 0 (output "Y" of the verification step 3004), the module 318 verifies at a step 3006 whether the address-alignment check is enabled. In case the address-alignment check is enabled (output "Y" of the verification step 3006), the module 318 executed at a step 3008 the address-alignment check and verifies at a step 3010 whether the result of the address-alignment check indicates that the parameter contains an error.

In case the parameter does not contain an error at the end of the address-alignment check (output "N" of the verification step 3006 or output "N" of the verification step 3010), the module 318 verifies at a step 3012 whether the start-address check is enabled. In case the start-address check is enabled (output "Y" of the verification step 3012), the module 318 execute at a step 3014 the start-address check and verifies at a step 3016 whether the result of the start-address check indicates that the parameter contains an error.

In case the parameter does not contain an error at the end of the start-address check (output "N" of the verification step 3012 or output "N" of the verification step 3016), the module 318 verifies at a step 3018 whether the end-address check is enabled. In case the end-address check is enabled (output "Y" of the verification step 3018), the module 318 executed at a step 3020 the end-address check and verifies at a step 3022 whether the result of the end-address check indicates that the parameter contains an error.

In case the parameter does not contain an error at the end of the end-address check (output "N" of the verification step 3018 or output "N" of the verification step 3022), the module 318 verifies at a step 3024 whether the maximum-value check is enabled. In case the maximum-value check is enabled (output "Y" of the verification step 3024), the module 318 executed at a step 3026 the maximum-value check and verifies at a step 3028 whether the result of the maximum-value check indicates that the parameter contains an error.

In case the parameter does not contain an error at the end of the maximum-value check (output "N" of the verification step 3024 or output "N" of the verification step 3028), the module 318 verifies at a step 3030 whether the zero-value check is enabled. In case the zero-value check is enabled (output "Y" of the verification step 3030), the module 318 executed at a step 3032 the zero-value check and verifies at a step 3034 whether the result of the zero-value check indicates that the parameter contains an error.

In case the parameter does not contain an error at the end of the zero-value check (output "N" of the verification step 3030 or output "N" of the verification step 3036), the module 318 reduces at a step 3036 the counter value and returns to the step 3004 for processing the next parameter.

Conversely, in case the parameter does contain an error at the end of one of the checks (output "Y" of any of the verification steps 3010, 3016, 3022, 3028 or 3034), the module sets at a step 3038 an error flag.

In case all parameters have been processed (output "N" of the verification step 3004) or once an error flag has been set at the step 3038, the module proceeds to a verification step 3040. Specifically, in the embodiment considered, the module 318 verifies whether an error occurred (e.g., whether one of the error flags has been set or whether the signal STAT_RX indicates that a transmission error occurred). Specifically, in case no error occurred (output "N" of the verification step 3040), the procedure terminates at a stop step 3044. Conversely, in case an error occurred (output "Y" of the verification step 3040), the parameter check module may start an error routine 3042. For example, as described with respect to the message handler module, this may be done by setting the signal P_ERR, which may be processed by the message handler module 316 in order to determine the service handler.

Accordingly, the above operations, when implemented in software, may require a significant amount of software instructions, which can severely impact the latency. Moreover, in full-duplex communications (which is the case, for example, when using the SHE protocol for the communication between a secure and non-secure element), the steps shown in FIG. 11 may be required two times: one time when the secure element HSMa receives the service request and has to process the parameters, and one time when the non-secure element receives the answer.

In the following will thus be described a hardware implementation of the parameter check module 318. Specifically, in this case one or more of the checks may be performed in parallel, thereby reducing the latency of the processing.

As mentioned in the foregoing, the transmitted message MSG comprises one command CMD and an optional parameter field P comprising possible optional parameters. Accordingly, the number of parameters transmitted may be between zero (no parameter transmitted) and a maximum number of parameters. In various embodiments, the maximum number of parameters is fixed, e.g., to 8. Generally, the length of the parameter field P may thus be variable (only the parameters used are transmitted) or fixed (e.g., the unused bits are set to "G0")

Accordingly, the combination of the current command value CMD and the index P_ID of the currently processed parameter (e.g., from 0 to 7) determine the checks to be executed for the current parameter.

Generally, the check of the parameters may be performed sequentially with the same module 318 or (at least partially) in parallel with a plurality of parallel modules 318. For example, a single parameter check module 318 may be sufficient in case the message MSG is transmitted with a serial communication protocol. For example, in this case, the parameter check may be performed already during the reception of the message MSG. However, due to the fact that some of the parameters may influence also the verification of other parameters (e.g., the number of data to be processed influences the end-address), it is preferable that the parameters are processed (in parallel or sequentially) once the complete message MSG has been received and stored in the buffer 312. In fact, in this way, possible transmission errors of the message MSG may also be verified first. Accordingly, in the following description the term "current parameter" refers generally to a currently processed parameter in a sequential and/or parallel processing instant.

In various embodiments, the parameter check module 318 supports one or more of the following parameter checks:
  zero-value: this check compares the current parameter with the zero value (which not necessarily has to correspond to the bit sequence "0 . . . 0", but also other encoding schemes may be used);
  start-address: this check compares the current parameter with the start-address/addresses of the memory/memories addressable by the microprocessor 106a (this information may be hardwired in the circuit and defined during the design phase);
  end-address: this check compares the sum of the current parameter and another parameter (e.g., the start address parameter plus a data amount parameter, or vice versa) with the end-address/addresses of the memory/memories addressable by the microprocessor 106a (this information may again be hardwired in the circuit and defined during the design phase);
  maximum value: this check compares the current parameter with a given maximum value; and
  address alignment: this check verifies whether the current parameter is a multiple of a given integer number, e.g., 2 and/or 4, depending on the type of chosen alignment (respectively word and/or double-word).

Figure 12:
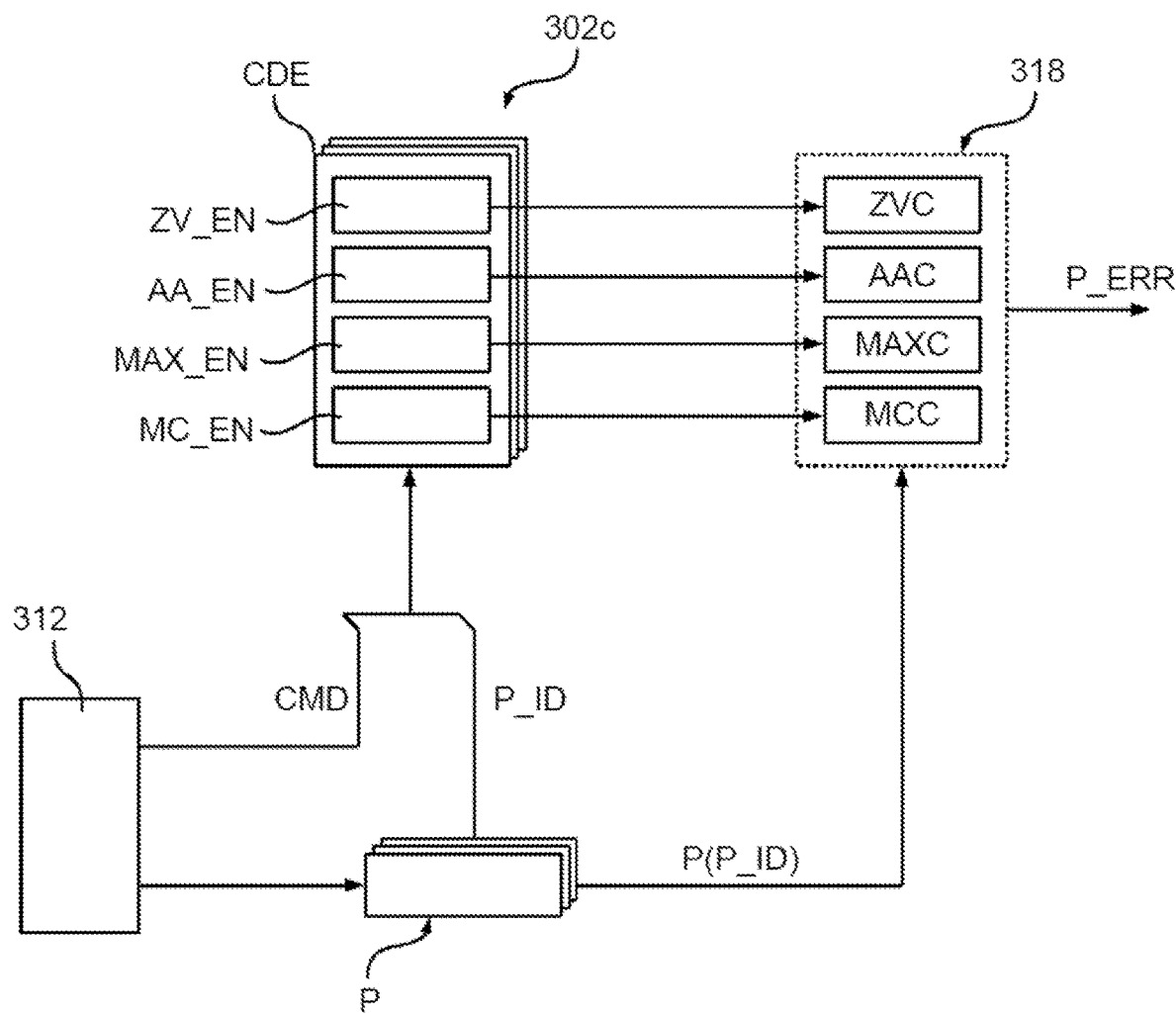
FIG. 12 illustrates a block diagram showing a first embodiment of the configuration data memory of FIG. 10.

FIG. 12 shows a first embodiment of the configuration memory/register 302c and the parameter check module 318.

Specifically, in the embodiment considered, the parameter check module 318 comprise four sub-circuits:
  a zero-value check circuit ZVC configured to implement the zero-value check;
  an address alignment check circuit AAC configured to implement the address alignment check;
  a maximum value check circuit MAXC configured to implement the maximum value check; and
  a memory check circuit MCC configured to implement the start- and end-address check.

Accordingly, in the embodiment considered, the configuration memory/register 302c comprises a look-up table comprising a plurality of configuration data elements CDE, where each configuration data element CDE comprises data for selectively enabling/disabling each of the sub-circuits of the parameter check module 318, such as:
  a zero-value check enable flag ZV_EN for enabling the zero-value check circuit ZVC;
  an address alignment check enable flag AA_EN for enabling the address alignment check circuit AAC;
  a maximum value check enable flag MAX_EN for enabling the maximum value check circuit MAXC; and
  a memory check enable flag MC_EN for enabling the memory check circuit MCC.

For example, each of the flags may be implemented with a single bit. Generally, each configuration data element CDE may also comprise further configuration data, such as the maximum value to be used by the maximum value check circuit MAXC and/or the type of address alignment (e.g., word or double-word) to be verified by the address alignment check circuit AAC.

In the embodiment considered, a respective configuration data element CDE is associated univocally with each combination of command CMD and parameter index P_ID.

Thus, in the worst case, assuming that the command field CMD has 1 byte (8 bit) and the parameter field P may comprise up to 8 parameters, e.g., the parameter index may be encoded with 3 bits, the memory/register 302c would have to contain up to $2^{(8+3)}$ configuration data elements CDE. Generally, the elements may also be less, e.g., because the commands supported may be less (see also the description of the message handler module and the default handler).

Moreover, the inventors have observed that many configuration data elements CDE are identical for several combinations of commands CMD and parameter indices P_ID, e.g., parameters containing a memory address usually are subject to similar checks.

Figure 13:
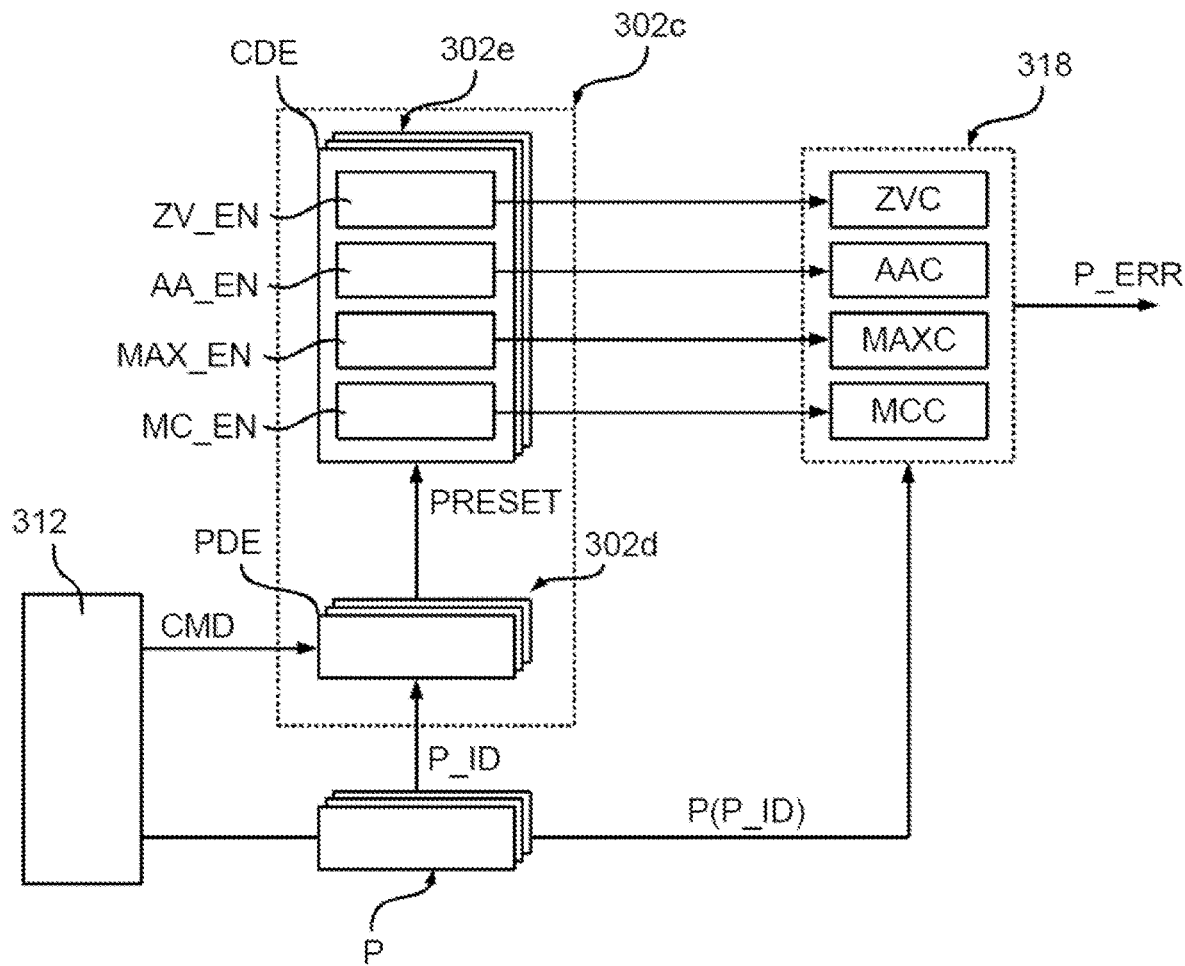
FIG. 13 illustrates a block diagram showing a second embodiment of the configuration data memory using preset configuration information.

Accordingly, FIG. 13 shows an alternative embodiment, in which the memory/register 302a has been reorganized.

Specifically, in the embodiment considered, the memory/register 302c has been split into two sub-memories/registers 302d and 302e, each comprising a look-up table. Specifically, the memory/register 302e comprises a look-up table of preset configuration data elements, i.e., this look-up table provides the current configuration data element CDE as a function of a preset index PRESET. Conversely, the memory/register 302d comprises a look-up table, where with each combination of command CMD and parameter index P_ID is associated a respective preset index PRESET, i.e., this look-up table provides the preset index PRESET for the memory/register 302e as a function of the command CMD and the parameter index P_ID.

Figure 14:
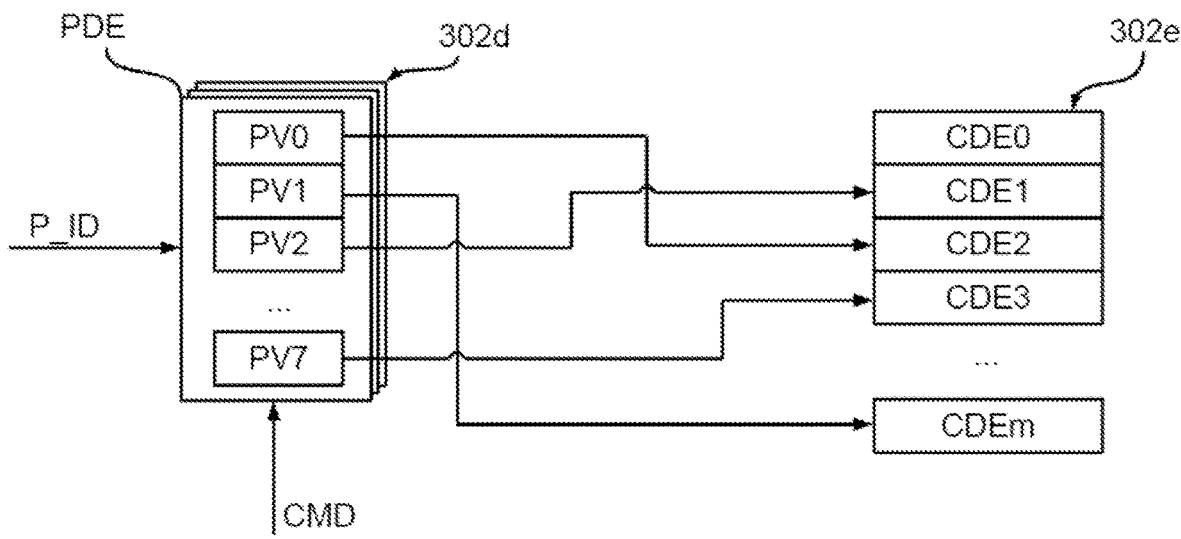
FIG. 14 shows a detailed view of the embodiment of FIG. 13.

For example, as shown in FIG. 14, with each value of the command field CMD may be associated a preset data element PDE. Specifically, each preset data element PDE comprises a sequence of preset values PV, one for each possible parameter. For example, in the embodiment considered, the preset data element PDE would comprise 8 preset values PV0 ... PV7. Specifically, in the embodiment considered, the parameter index P_ID is used to select the corresponding preset values PV, e.g., the first preset values PV0 for the parameter index P_ID=0, etc.

The currently selected preset value PV (selected as a function of the command CMD and the parameter index P_ID) is then used as preset signal PRESET to select the configuration data element CDE in the look-up table 302e. For example, as shown in FIG. 14, the look-up table 302e may comprise a given number of configuration data elements CDE0 ... CDEm, and one of the configuration data elements CDE0 ... CDEm is selected as a function of the value of the currently selected preset value PV. For example, empirical tests performed by the inventors have shown that 16 configuration data elements CDE are sufficient for common security applications. Accordingly, the preset values PV may be encoded with 4 bit.

Accordingly, in the embodiment considered with 8 parameters, each preset data element PDE may consist in 32 bits (4 bits for each of the 8 preset values PV0 ... PV7). For example, FIG. 15 shows a possible bit map for each parameter data element PDE.

In the embodiment considered, the memory/register 302d comprises a corresponding preset data element PDE for each command CMD. For example, assuming that the command field has 8 bits (1 byte), the memory/register 302d may comprise 256×32 bits. Generally, also in this case, less than 256 commands may be supported, e.g., 16, 32, 64 or 128, and the remaining command codes may generate an error or be assigned to a default handler (see also the description of the message handler module 316).

Accordingly, in the embodiment considered, the preset registers 302e contain configuration data elements CDE, which define which checks should be enabled and with which attributes. Conversely, the preset value register 302d comprises preset vales PV (e.g., organized in preset data elements PDE), which define which configuration data elements CDE should be used.

Generally, similar to the look-up table LUT described with respect to the message handler module 316, also the look-up tables 302c, 302d e/o 302e may be implemented with a non-volatile memory (e.g., a flash memory), with a volatile memory (e.g., a RAM) or with registers (e.g., one or more special function registers of the microprocessor 106a). For example, in case these look-up tables are implemented in a volatile memory or registers, the processing unit 106a may write (e.g., by using a software instructions) the content of the look-up tables during an initialization phase.

Figure 17:
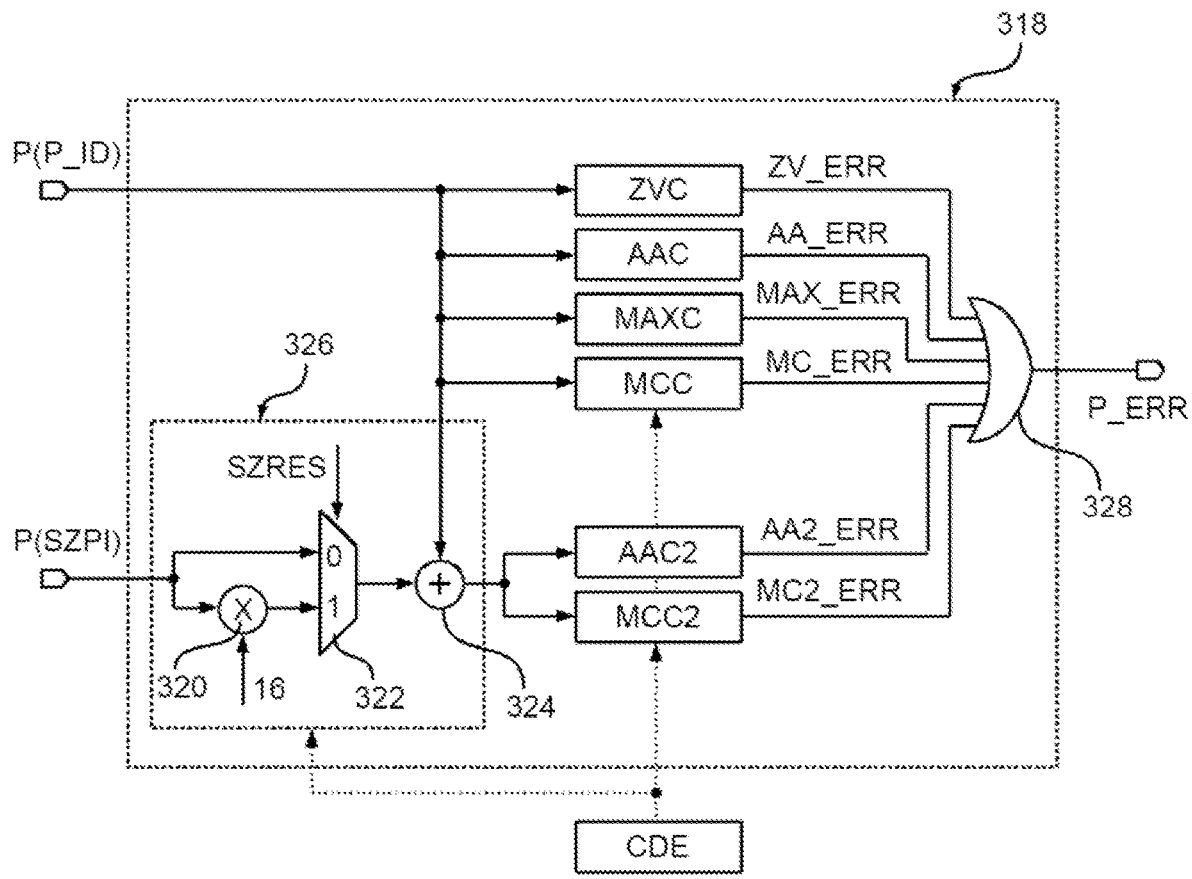
FIG. 17 illustrates a block diagram showing a hardware implementation of the parameter check module of FIG. 12 or 13.

FIG. 16 shows a possible embodiment of the bit mapping of each configuration data element CDE and FIG. 17 shows a possible embodiment of the parameter check module 318.

The operation will be discussed again just byway of illustration at the exemplary parameter field P, which may include the following three parameters (with the remaining five parameters being unused):
 the first parameter identifies the source start-address were the data to be processed are stored;
 the second parameter identifies the destination start address were the processed data should be stored; and
 the third parameter identifies the quantity of data to be processed, e.g., assuming an encryption algorithm operating on 32-bit data, the number of "double-words" (4 bytes).

Specifically, as mentioned in the foregoing and as shown in FIG. 17, the parameter check module 318 comprises one or more sub-circuits, such as a zero-value check circuit ZVC, an address alignment check circuit AAC, a maximum value check circuit MAXC and/or a memory check circuit MCC. These circuits of the parameter check module 318 receive at input the currently selected parameter P(P_ID), i.e., the parameter at the current parameter index P_ID, and the currently selected configuration data element CDE (selected as a function of the current command CMD and the current parameter index P_ID). Generally, the same applies to a plurality of parallel parameter check modules 318 receiving at input different parameters P(P_ID) and respective configuration data elements CDE. For example, in this context the use of preset data element PDE comprising the preset data for all parameters of a given command CMD are particularly useful, because no separate memory accesses are required, but the various preset values PV0 ... PV7 may be used simultaneously.

For example, in the embodiment considered, the configuration data element CDE comprises configuration data for enabling the various sub-circuits of the parameter check module 318. For example, these configuration data may include the flags ZV_EN (zero value check enable flag), MC_EN (memory check enable flag), AA_EN (address alignment check enable flag) and MAX_EN (maximum value check enable flag) described in the foregoing. Generally, as will be described in the following, it is not necessary that theses flags are provided explicitly, i.e., as a single bit, but the flags may be indicated also implicitly, e.g., by the content of other data of the configuration data element CDE. In addition to these flags, the configuration data element CDE may comprise further configuration data, which may be required by specific sub-modules to perform the respective check.

For example, as mentioned in the foregoing, the zero-value check circuit ZVC may be enabled when the zero-value check enable flag ZVC_EN has a given logic value (e.g., "i"). For example, in case the zero-value check circuit ZVC is enabled, the circuit ZVC is configured to verify whether the value of the current parameter P(P_ID) is zero. For example, if the value is not zero, the circuit ZVC may generate an error flag ZV_ERR. For example, this test may be used to verify whether unused parameters (e.g., for P_ID=3 ... 7) are set to zero. Accordingly, in the embodiment considered, a single configuration bit ZV_EN in the configuration data element CDE is sufficient and the circuit ZVC does not require any further configuration data.

As mentioned in the foregoing, the address alignment check circuit AAC may be enabled when the address alignment check enable flag AA_EN has a given logic value (e.g., "1"). For example, a single flag AA_EN may be useful in case the address alignment check circuit AAC is configured to support only a single alignment check, e.g., verify whether the value of the current parameter P(P_ID) is a multiple of four. Conversely, in the embodiment shown in FIG. 16, two bits AA are used, which may instruct the address alignment check circuit AAC to check the following alignments (in case of a 32-bit CPU):
 00: circuit disabled;
 01: half-word (16-bit) alignment;
 10: word alignment (32-bit); and
 11: double-word (64-bit) alignment.

Accordingly, in this case, the value of the field AA indicates implicitly the address alignment check enable flag AA_EN and the address alignment check circuit AAC may be enabled when the bits AA have a value different from "00". For example, the bits AA may be set to "10" or "11" for P_ID=0, 1, 2 and "00" for P_ID=3 ... 7. In the embodiment considered, the address alignment check circuit AAC is configured to generate an error flags AA_ERR when the address alignment check fails.

For example, the address alignment check circuit AAC may verify the least significant bits of the parameter P(P_ID) in order to determine whether the alignment is correct, e.g.:

verify whether the last bit is set to "0" for word alignment; and verify whether the last two bits are set to "00" for double-word alignment.

In the embodiment considered, the maximum value check circuit MAXC is enabled when the maximum value check enable flag MAX_EN has a given logic value (e.g., "1"). In the embodiment considered, the configuration data element CDE comprises also a field MAX specifying the maximum value to be used by the maximum value check circuit MAXC, i.e., (when enabled) the maximum value check circuit MAXC is configured to verify whether the value of the parameter being checked P(P_ID) is less than or equal to the value set into the MAX field and generates an error flag MAX_ERR when the check fails, i.e., when the parameter P(P_ID) is greater than the value MAX.

Generally, also in this case, the value of the maximum value field MAX may already indicate implicitly the maximum value check enable flag MAX_EN, e.g., because if the field MAX has a value different from zero, the maximum value check circuit MAXC should be enabled. Conversely, in the embodiment considered, when the value MAX is set to 0 and the enable flag MAX_EN is set, this enable flag MAX_EN is considered as a carry bit, i.e., the maximum value to be used by the circuit MAXC is set to "100 . . . 00" (all bits=0 and carry bit=1).

For example, in the embodiment considered, the maximum value check may be enabled with a given maximum value MAX for the third parameter (P_ID=2) and disabled for the other parameters.

As described in the foregoing, the memory check circuit MMC should verify whether the address provided by the parameter P(P_ID) and possibly an end-address calculated therefrom belong to a (shared) memory area addressable by the processing unit 106a and generate an error flag MC_ERR when the check fails.

For example, in the embodiment considered, the current parameters (e.g., P_ID=1 or P_ID=2) may be a (source or destination) start-address. Accordingly, in various embodiments, the memory check circuit MMC is configured to determine whether the current parameter P(P_ID) belongs to a memory area addressable by the processing unit, e.g., by comparing the current parameter P(P_ID) with one or more reference addresses, such as an upper reference address and/or lower reference address.

For example, in the embodiment considered, the processing unit 106a comprises a plurality of memory interfaces adapted to be connected to a plurality of shared memories, such as a non-volatile memory (e.g., a flash memory), a volatile memory (e.g., a RAM), and/or an external memory, where a different memory address range of the processing unit may be assigned to each of these memories. Accordingly, one or more of these memories may be a shared memory (e.g., a dual port memory) accessible also by the processing unit 102a.

Accordingly, in this case, the configuration data element may comprise also data identifying whether the address should belong to a particular memory. For example, in the embodiment considered shown in FIG. 16, the configuration data element contains two bits MC, which may instruct the memory check circuit MMC to check whether the current parameter P_ID belongs to:

00: disabled;
10: a shared non-volatile memory;
01: a shared volatile memory;
11: an external memory.

Accordingly, with each of these memories as indicated by the bits MC may be associated a respective upper reference address (and if required lower reference address) to be used by the memory check circuit MMC. Generally, the respective upper reference address (and if required lower reference address) for a single memory or each memory of the plurality of memories may be hardwired or stored in the configuration register 302c.

Similar to the bits AA, the bits MC may thus indicate implicitly the memory check enable flag MC_EN and the memory check circuit MMC may be enabled when the two bits MC are different from "00".

In various embodiments, the memory check circuit MMC may be configured (via the configuration data element CDE) to perform the same verification also when a parameter contains an (source or destination) end-address.

Conversely, in the embodiment discussed in the foregoing, the message MSG does not contain explicitly the memory (source or destination) end-address, but contains (in addition to the start addresses) only a parameter identifying the quantity of data to be processed. In this case, the memory check circuit MCC may thus calculate the (source or destination) end-address within the parameter check circuit 318 as a function of a respective start-address and the quantity of data to be processed.

For example, in the embodiment considered, the configuration data element comprises two additional fields SZEN and SZPI. Specifically, the field SZPI permits to specify the parameter index P_ID of the parameter expected to contain the size information. Conversely, the flag SZEN permits to enable the end-address calculation and verification. This flag is optional, because the end address verification could be activated automatically, e.g., always when the module MC has been activated (via the flag MC_EN) or by determining that the content of the field SZPI is different from the current parameter index P_ID.

In various embodiment, the configuration data element may also contain a field SZRES, indicating the resolution of the size information. Generally, this field is optional, and only a single resolution may be supported, e.g., the quantity information may always be in bytes, words, etc.

For example, in the embodiment considered a single flag is used to specify whether the size/quantity information provided by the parameter P(SZPI) refers to a byte number or AES block (comprising 16 bytes) number. Generally, also a plurality of bits could be used, e.g., in order to support also other resolutions, such as double word, etc.

Accordingly, in various embodiments, the memory check circuit MCC may calculate the end-address for the current parameter P(P_ID) expected to provide a start-address and the number of bytes to be processed, which in turn is determined as a function of the content of the parameter P(SZPI) and optionally the resolution information SZRES.

For example, in FIG. 17, this calculation of the end-address is schematically shown separate from the memory check circuit MCC. Specifically, in FIG. 17, the parameter P(SZPI) containing the size information is provided to a multiplier 320 and a multiplexer 322 in order to determine the size information in bytes based on the value of the parameter P(SZPI) and the resolution information SZRES, e.g., implementing the following equations:

$$SIZE = P(SZPI), \text{when } SZRES=0; \text{ and}$$

$$SIZE = 16 \times P(SZPI), \text{when } SZRES=1.$$

For example, such multiplication at the multiplier 320 may be implemented with a shift register. In the embodiment considered, the size SIZE is thus in bytes. However, also other resolutions may be used. In fact, the resolution of the size SIZE corresponds preferably to the data-width of the memory used (e.g., byte in the example considered), i.e., the size SIZE corresponds to the number of memory location required to store the quantity of data specified by the parameter P(SZPI).

The size SIZE and the content of the current parameter P(P_ID) (which should contain a start-address) are provided to an adder 324, which provides thus at output the end-address, i.e., the sum of the start-address and the number of memory location required Accordingly, the multiplier 320, the multiplexer 322 and the adder 324 represent an end-address calculation circuit 326, where the multiplier 320 and the multiplexer 322 are only required when the parameter P(SZPI) may be provided with a different resolution than the size SIZE.

In various embodiments, the end-address provided by the circuit 326 may then be processed as described with respect to the start-address in order to verify whether the address belongs to a memory area addressable by the processing unit 106a. For example, in FIG. 17 this is schematically shown by a separate memory check circuit MCC2, which uses the same configuration information as the memory check circuit MCC described in the foregoing (in particular with respect to the field MCEN). Accordingly, this circuit MCC2 generate an error flag MC2_ERR when the end-address does not belong to a memory area addressable by the processing unit 106a.

Generally, the circuits MCC and MCC2 may also be slightly different. For example, the circuit MCC may only verify whether the start-address P(P_ID) is greater than a lower reference address (selected e.g., based on the content of the field MC) and the circuit MCC2 may only verify whether the end-address P(P_ID)+SIZE is smaller than a upper reference address (selected e.g., based on the content of the field MC).

In various embodiments, the address alignment circuit AAC may also verify whether the end-address provided by the circuit 326 has a correct alignment. For example, again by way of illustration, FIG. 17 shows a separate address alignment check circuit AAC2, which uses the same configuration information as the alignment check circuit AAC described in the foregoing (in particular with respect to the field AA). Accordingly, this circuit AAC2 generate an error flag AA2_ERR when the end-address does not have the correct alignment.

Accordingly, in the embodiments considered, each of the circuits ZVC, AAC, MAXC and MCC (and possibly the circuits AAC2 and MCC2) generate respective error flags. These flags may be provided separately to the message handler module and/or the processing unit 106a. Conversely, in the embodiment considered, these flags are combined in order to generate a single flag/signal P_ERR being set when any of the various flags has been set. For example, in case an error is set when the corresponding flag is set to high, an OR gate 328 may be used for this purpose.

Accordingly, in the embodiment shown in FIG. 16, the configuration data element CDE would have 32 bits and could contain the following fields for both the first (source start address) and the second (destination start address) parameter:

MC="01" (shared RAM);
SZEN="1" (end-address check enabled), SZPI="010" (third parameter contains size/quantity information), SZRES="1" (size information has AES block resolution);
AA="10" (word alignment check enabled);
MAXEN="0", MAX="0 . . . 0", ZV="0" (maximum value and zero-value checks disabled).

Conversely, the configuration data element CDE could contain the following fields for the third parameter (quantity information):

MAXEN="1", with the field MAX set to a given value based on the system specifications (maximum value check enabled);
ZV="0" (zero value check disabled);
MC="00" (memory check disabled);
SZEN="0", SZPI="000", SZRES="o" (end-address check disabled));
AA="00" (alignment check disabled).

Figure 18:
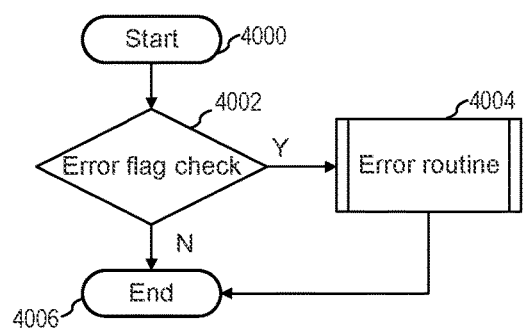
FIG. 18 illustrates a flow-chart of an embodiment of the processing unit of the hardware secure element configured to perform a parameter check.

By using a hardware parameter check circuit 318 as described in the foregoing, the software flow shown in FIG. 11 may be reduced as shown in FIG. 18.

Specifically, after a start step 4000 (corresponding essential to the step 3000 described with respect to FIG. 11), the microprocessor 106a may only verify at a step 4002 whether the error flag P_ERR has been set.

In case the error flag P_ERR has been set (output "Y" at the verification step 4002), the microprocessor 106a may start an error routine 4004 (essentially corresponding to the routine 3042 shown in FIG. 11). Generally, the error routine 4004 may also take into account the specific error flags ZV_ER, AA_ERR, etc.

In case the error flag P_ERR has not been set (output "N" at the verification step 4002) and at the end of the error routine 4004, the procedure stops at a step 4006.

As mentioned before, the verification of the flag P_ERR may already be implemented in the message handler module 316, which selects the handler to be executed by the microprocessor 106a.

Accordingly, the message handler module 316 and the parameter check module 318 described in the foregoing, may be implemented with a dedicated hardware 314, which is particularly useful in case the processing unit 106a is implemented with a microprocessor programmed via software instructions. Preferably, the hardware message handler module 316 and the hardware parameter check module 318 are used in combination. However, generally, the modules may also be used separately, e.g., the parameter check module 318 may be implemented in hardware and the message handler module 316 may be implemented in software (or vice versa).

Of course, without prejudice to the principle of the invention, the details of construction and the embodiments may vary widely with respect to what has been described and illustrated herein by way of example, without thereby departing from the scope of the present invention, as defined by the ensuing claims.

For example, while the look-up tables described in the foregoing have been implemented with memories and/or registers, one or more of the look-up tables may also be implemented with combinational circuits. However, the use of memories and/or registers has the advantage that the look-up tables may be re-programmed, e.g., by the processing unit 106a or a firmware update of the secure element HSMa.

What is claimed is:

1. An electronic circuit comprising:
   a first input terminal configured to receive a command field;
   a first output terminal configured to deliver a service handler address indicative of a start address of a service handler of a set of service handlers; and
   a message handler circuit coupled between the first input terminal and the first output terminal, the message handler circuit configured to:
      receive a handler number indicative of a number of service handlers in the set of service handlers,
      receive a look-up-table (LUT) start address indicative of a start address of a LUT,
      receive a first error signal indicative of whether there is an error associated with the command field,
      determine the service handler address based on the handler number, the LUT start address, and the first error signal, and
      deliver the service handler address to the first output terminal.

2. The electronic circuit of claim 1, wherein the message handler circuit comprises a first multiplexer comprising:
   an output coupled to the first output terminal;
   a first selection input configured to receive the first error signal;
   a first data input configured to receive first data, the first data being based on the command field and the LUT start address; and
   a second data input configured to receive second data, wherein the first multiplexer is configured to couple the second data input of the first multiplexer to the output of the first multiplexer when the first error signal indicates that there is an error associated with the command field.

3. The electronic circuit of claim 2, wherein the message handler circuit further comprises a digital comparator having a first input configured to receive the command field, and a second input configured to receive the handler number, wherein the first multiplexer further comprises:
   a second selection input coupled to an output of the digital comparator; and
   a third data input configured to receive third data, wherein the first multiplexer is configured to couple the first data input of the first multiplexer to the output of the first multiplexer when the command field is lower than the handler number and the first error signal indicates that there are no errors associated with the command field, and wherein the first multiplexer is configured to couple the third data input of the first multiplexer to the output of the first multiplexer when the command field is higher than the handler number and the first error signal indicates that there are no errors associated with the command field.

4. The electronic circuit of claim 3, wherein the message handler circuit further comprises:
   a first multiplier having a first input configured to receive a first factor and a second input coupled to the first input terminal, the first factor being a positive integer; and
   a first adder having a first input configured to receive the LUT start address, a second input coupled to an output of the first multiplier, and an output coupled to the first data input of the first multiplexer.

5. The electronic circuit of claim 4, wherein the message handler circuit further comprises a second adder having an input coupled to the first input terminal, a second input configured to receive an offset, and an output coupled to the second data input of the first multiplier.

6. The electronic circuit of claim 2, wherein the message handler circuit further comprises a second multiplexer having a selection input configured to receive an error type signal, a first input configured to receive a first factor, the first factor being a positive integer, a second input configured to receive the first factor multiplied by two, and an output coupled to the second data input of the first multiplexer.

7. The electronic circuit of claim 6, wherein the message handler circuit further comprises a first adder having a first input coupled to the output of the second multiplexer, a second input configured to receive the LUT start address, and an output coupled to the second data input of the first multiplexer.

8. The electronic circuit of claim 1, further comprising a memory configured to store the LUT and the set of service handlers.

9. The electronic circuit of claim 1, wherein the first input terminal is coupled to a non-secured processing unit, and wherein the first output terminal is coupled to a secure processing unit.

10. The electronic circuit of claim 1, further comprising a first register configured to store the handler number.

11. The electronic circuit of claim 1, further comprising a first register configured to store the LUT start address.

12. The electronic circuit of claim 1, further comprising:
   a second input terminal configured to receive a parameter field; and
   a parameter check circuit configured to generate a second error signal indicative of whether the parameter field is valid, wherein the first error signal is based on the second error signal.

13. The electronic circuit of claim 12, wherein the parameter check circuit comprises:
   an OR gate having an output configured to generate the second error signal; and
   a plurality of parameter check sub-circuits having respective outputs coupled to respective inputs of the OR gate.

14. An electronic circuit comprising:
   a first input terminal configured to receive a command field;
   a second input terminal configured to receive a parameter field;
   a first output terminal configured to deliver a service handler address indicative of a start address of a service handler of a set of service handlers;
   a parameter check circuit configured to generate a first error signal indicative of whether the parameter field is valid; and
   a message handler circuit configured to:
      receive a handler number indicative of a number of service handlers in the set of service handlers,
      receive a look-up-table (LUT) start address indicative of a start address of a LUT,
      receive a second error signal indicative of whether there is an error associated with the command field, wherein the second error signal is based on the first error signal,
      determine the service handler address based on the handler number, the LUT start address, and the second error signal, and
      deliver the service handler address to the first output terminal.

15. The electronic circuit of claim 14, wherein the message handler circuit comprises a first multiplexer comprising:
- an output coupled to the first output terminal;
- a first selection input configured to receive the second error signal;
- a first data input configured to receive first data, the first data being based on the command field and the LUT start address; and
- a second data input configured to receive second data, wherein the first multiplexer is configured to couple the second data input of the first multiplexer to the output of the first multiplexer when the second error signal indicates that there is an error associated with the command field.

16. The electronic circuit of claim 15, further comprising a third input terminal configured to receive a transmission error signal, wherein the second error signal is further based on the transmission error signal.

17. The electronic circuit of claim 16, wherein the message handler circuit further comprises a second multiplexer comprising:
- a selection input configured to receive an error type signal that is based on the transmission error signal and on the first error signal;
- a first input configured to receive a first factor, the first factor being a positive integer;
- a second input configured to receive the first factor multiplied by two; and
- an output coupled to the second data input of the first multiplexer.

18. An electronic circuit comprising:
- a digital comparator having a first input configured to receive a command field, and a second input configured to receive a handler number indicative of a number of service handlers in a set of service handlers; and
- a first multiplexer comprising:
  - an output configured to deliver a service handler address indicative of a start address of a service handler of the set of service handlers,
  - a first selection input configured to receive a first error signal, wherein the first error signal is indicative of whether there is an error associated with the command field,
  - a second selection input coupled to an output of the digital comparator,
  - a first data input configured to receive first data, the first data being based on the command field and on a look-up-table (LUT) start address, wherein the LUT start address is indicative of a start address of a LUT,
  - a second data input configured to receive second data, the second data being based on the LUT start address, and
  - a third data input configured to receive third data, wherein the first multiplexer is configured to:
    - couple the third data input of the first multiplexer to the output of the first multiplexer when the first error signal indicates that there is an error associated with the command field,
    - couple the first data input of the first multiplexer to the output of the first multiplexer when the command field is lower than the handler number and the first error signal indicates that there are no errors associated with the command field, and
    - couple the second data input of the first multiplexer to the output of the first multiplexer when the command field is higher than the handler number and the first error signal indicates that there are no errors associated with the command field.

19. The electronic circuit of claim 18, further comprising:
- a first multiplier having a first input configured to receive a first factor and a second input coupled to the first input of the digital comparator, the first factor being a positive integer; and
- a first adder having a first input configured to receive the LUT start address, a second input coupled to an output of the first multiplier, and an output coupled to the first data input of the first multiplexer.

20. The electronic circuit of claim 19, wherein the second data input of the first multiplexer is configured to receive the LUT start address.

* * * * *